United States Patent
Kennedy (12)

(10) Patent No.: US 6,330,589 B1
(45) Date of Patent: Dec. 11, 2001

(54) SYSTEM AND METHOD FOR USING A CLIENT DATABASE TO MANAGE CONVERSATION THREADS GENERATED FROM EMAIL OR NEWS MESSAGES

(75) Inventor: Kevin Alan Kennedy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/084,729

(22) Filed: May 26, 1998

(51) Int. Cl.[7] .............................. G06F 15/16; G06F 7/00

(52) U.S. Cl. ............................................ 709/206; 707/104

(58) Field of Search .................................. 709/203, 206; 707/10, 102, 104; 379/93.24

(56) References Cited

U.S. PATENT DOCUMENTS

| | | | | |
|---|---|---|---|---|
| 5,632,011 | * | 5/1997 | Landfield et al. | 709/206 |
| 5,757,669 | * | 5/1998 | Christie et al. | 709/205 |
| 5,793,972 | * | 8/1998 | Shane | 709/219 |
| 5,819,269 | * | 10/1998 | Uomini et al. | 707/7 |
| 5,826,022 | * | 10/1998 | Nielsen | 709/206 |
| 5,832,502 | * | 11/1998 | Durham et al. | 707/104 |
| 5,875,302 | * | 2/1999 | Obhan | 709/225 |
| 5,893,087 | * | 4/1999 | Wlashin et al. | 707/3 |
| 5,905,863 | * | 5/1999 | Knowles et al. | 709/206 |
| 5,909,679 | * | 6/1999 | Hall | 707/4 |
| 5,928,333 | * | 7/1999 | Landfield et al. | 709/245 |
| 5,937,162 | * | 8/1999 | Funk et al. | 709/206 |
| 6,020,884 | * | 2/2000 | MacNaughton et al. | 345/329 |
| 6,026,396 | * | 2/2000 | Hall | 707/4 |
| 6,073,137 | * | 6/2000 | Brown et al. | 707/104 |
| 6,092,101 | * | 7/2000 | Birrell et al. | 709/206 |
| 6,105,055 | * | 8/2000 | Pizano et al. | 709/204 |
| 6,134,582 | * | 10/2000 | Kennedy | 709/206 |
| 6,167,402 | * | 12/2000 | Yeager | 707/10 |

FOREIGN PATENT DOCUMENTS 2 327 516   *   2/1999 (GB).

OTHER PUBLICATIONS

Crocker, D., RFC 822, "Standard for the Format of ARPA Internet Text Messages," Network Working Group, pp. 1–47, Aug. 1992.*

Comer, D., et al., "Conversation–Based Mail," ACM Trans. on Computer Systems, vol. 4, No. 4, pp. 299–319, Nov. 1986.*

(List continued on next page.)

*Primary Examiner*—Zarini Maung
*Assistant Examiner*—Andrew Caldwell
(74) *Attorney, Agent, or Firm*—Kilpatrick Stockton LLP

(57) ABSTRACT

A system including a client database for managing conversation threads generated from messages communicated in a client-server achitecture is disclosed. The client database efficiently manages messages and optimizes communication between the client and server. In a specific embodiment, the messages include email messages from a SMTP server and news messages from a NNTP server. The conversation threads are generated for use in a MAPI format-sensitive application. The client database maintains a central archive of message-related information to support conversation threading of current and future messages downloaded from the server to the client. The client database supports efficient management of conversations so that conversation roots and nested replies are presented sequentially. When a message refers to another, unreceived message, the system creates a placeholder for the unreceived message in the client database. Using a placeholder eliminates the need to rethread all conversations after every download. The database includes data fields corresponding to specific fields of a typical MAPI format. The database also includes data fields to assist in providing more efficient and timely operation of retrieving and threading conversations from a local message store, such as a MAPI store. News messages can also be converted from a news conversation threading structure to a MAPI format.

30 Claims, 14 Drawing Sheets

OTHER PUBLICATIONS

Shepherd, A., et al., "Strudel—An Extensible Electronic Conversion Toolkit," Proc. of the Conf. on Computer–Supported Cooperative Work, ACM, pp. 93–104, Oct. 1990.*

Palme, J., et al., "SuperKOM—Design Considerations for a Distributed, Highly Structured Computer Conferencing System," Computer Communications, vol. 15, No. 8, pp. 509–518, Oct. 1992.*

Hall, R., "INFOMOD: A Knowledge–Based Moderator for Electronic Mail Help Lists," Proc. of the 5th Int'l. Conf. on Information and Knowledge Management, ACM, pp. 107–114, Nov. 1996.*

Levitt, Mark, "POP Goes the E–Mail," Copyright ©1996 International Data Corporation, published Sep. 1996, Document #12210, pp 1–9.

"What is IMAP!" article found on the World Wide Web at http://www.imap.org/whatisIMAP.html, The IMAP Connection, ©1996 The University of Washington, p. 1.

Gray, Terry, "Comparing Two Approaches to Remote Mailbox Access: IMAP vs. POP," article found on the World Wide Web at http://www.imap.org/imap.vs.pop.brief.html, Nov. 5, 1993, pp. 1–4.

Gray, Terry, "Message Access Paradigms and Protocols," article found on the World Wide Web at http://www.imap.org/imap.vs.pop.html, Aug. 28, 1995, pp. 1–10.

Crispin, M., "Internet Message Access Protocol—Version 4rev1," article found on the World Wide Web at http://www.imap.org/docs/rfc2060.html, Dec. 1996, p. 1.

Myers et al., "Post Office Protocol—Version 3," Carnegie Mellon, Dover Beach Consulting, Inc., Nov. 1994, pp. 1–8.

* cited by examiner

ARTICLE 100

| TITLE | MESSAGE ID | REFERENCES FIELD | |
|---|---|---|---|
| MESSAGE 1 | A | - NO REFERENCE - | 100 |
| MESSAGE 2 | B | < A > | 102 |
| MESSAGE 3 | C | < A > < B > | 104 |
| MESSAGE 4 | D | < A > | 106 |

(SIMPLE CASE)
FIG.4a

ARTICLE 200

| TITLE | MESSAGE ID | REFERENCES FIELD | |
|---|---|---|---|
| MESSAGE 1 | A | - NO REFERENCE - | 110 |
| MESSAGE 2 | B | < A > | 112 |
| MESSAGE 3 | C | < A > < B > | 114 |
| MESSAGE 4 | D | < A > | 116 |
| MESSAGE 5 | E | < A > < D > | 118 |
| MESSAGE 6 | F | < A > < D > < E > | 120 |
| MESSAGE 7 | G | < D > < E > < F > | 122 |
| MESSAGE 8 | H | < A > < D > < E > | 124 |

(COMPLEX CASE)
FIG.4b

| TITLE | MAPI FORMAT |
|---|---|
| MESSAGE 1 | A — 100a |
| MESSAGE 2 | A \| B — 102a |
| MESSAGE 3 | A \| B \| C — 104a |
| MESSAGE 4 | A \| D — 106a |

(SIMPLE CASE)

FIG.4c

| TITLE | MAPI FORMAT |
|---|---|
| MESSAGE 1 | A — 110a |
| MESSAGE 2 | A \| B |
| MESSAGE 3 | A \| B \| C |
| MESSAGE 4 | A \| D — 116a |
| MESSAGE 5 | A \| D \| E — 118a |
| MESSAGE 6 | A \| D \| E \| F — 120a |
| MESSAGE 7 | ? \| D \| E \| F \| G — 122a |
| MESSAGE 8 | A \| D \| E \| H — 124a |

(COMPLEX CASE)

FIG.4d

CONVERSATION INDEX

| EID | ARTICLE NO. | TITLE | MESSAGE ID | PARENT ID | POSTED TIME | "ROOT" FLAG | "DIRTY" FLAG | "PLACE HOLDER" FLAG |
|---|---|---|---|---|---|---|---|---|
| 1 | 100 | MESSAGE 1 | A | – | 1/1/98 08:00:00 | T | T | F |
| 2 | 100 | MESSAGE 2 | B | A | 1/1/98 08:01:00 | F | T | F |
| 3 | 100 | MESSAGE 3 | C | B | 1/1/98 08:02:00 | F | T | F |
| 4 | 100 | MESSAGE 4 | D | A | 1/1/98 08:03:00 | F | T | F |

| EID | ARTICLE NO. | TITLE | MESSAGE ID | PARENT ID | POSTED TIME | "ROOT" FLAG | "DIRTY" FLAG | "PLACE HOLDER" FLAG |
|---|---|---|---|---|---|---|---|---|
| 1 | 100 | MESSAGE 1 | A | – | 1/1/98 08:00:00 | T | F | F |
| 2 | 100 | MESSAGE 2 | B | A | 1/1/98 08:01:00 | F | F | F |
| 3 | 100 | MESSAGE 3 | C | B | 1/1/98 08:02:00 | F | F | F |
| 4 | 100 | MESSAGE 4 | D | A | 1/1/98 08:03:00 | F | F | F |

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | T | F |
| 2 | 200 | – | F | E | – | F | T | T |
| 3 | 200 | – | E | D | – | F | T | T |
| 4 | 200 | – | D | – | – | T | T | T |

FIG.7a

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | F | F |
| 2 | 200 | – | F | E | – | F | F | T |
| 3 | 200 | – | E | D | – | F | F | T |
| 4 | 200 | – | D | – | – | T | F | T |

FIG.7b

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | T | F |
| 2 | 200 | – | F | E | – | F | T | T |
| 3 | 200 | – | E | D | – | F | T | T |
| 4 | 200 | – | D | A | – | F | T | T |
| 5 | 200 | MESSAGE 8 | H | E | 1/3/98 08:00:00 | F | T | F |
| 6 | 200 | – | A | – | – | T | T | T |

FIG.7c

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | F | F |
| 2 | 200 | – | F | E | – | F | F | T |
| 3 | 200 | – | E | D | – | F | F | T |
| 4 | 200 | – | D | A | – | F | F | T |
| 5 | 200 | MESSAGE 8 | H | E | 1/3/98 08:00:00 | F | F | F |
| 6 | 200 | – | A | – | – | T | F | T |

FIG.7d

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | T | F |
| 2 | 200 | – | F | E | – | F | T | T |
| 3 | 200 | – | E | D | – | F | T | T |
| 4 | 200 | – | D | A | – | F | T | T |
| 5 | 200 | MESSAGE 8 | H | E | 1/3/98 08:00:00 | F | T | F |
| 6 | 200 | MESSAGE 1 | A | – | 1/4/98 08:00:00 | T | T | F |

FIG.7e

DATABASE 39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | T | F |
| 2 | 200 | – | F | E | – | F | T | T |
| 3 | 200 | – | E | D | – | F | T | T |
| 4 | 200 | MESSAGE 4 | D | A | 1/4/98 08:01:00 | F | T | F |
| 5 | 200 | MESSAGE 8 | H | E | 1/3/98 08:00:00 | F | T | F |
| 6 | 200 | MESSAGE 1 | A | – | 1/4/98 08:00:00 | T | T | F |

FIG.7f

DATABASE
/-39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | T | F |
| 2 | 200 | -- | F | E | -- | F | T | T |
| 3 | 200 | MESSAGE 5 | E | D | 1/4/98 08:02:00 | F | T | F |
| 4 | 200 | MESSAGE 4 | D | A | 1/4/98 08:01:00 | F | T | F |
| 5 | 200 | MESSAGE 8 | H | E | 1/3/98 08:00:00 | F | T | F |
| 6 | 200 | MESSAGE 1 | A | -- | 1/4/98 08:00:00 | T | T | F |

FIG. 7g

DATABASE
/-39

| EID 300 | ARTICLE NO. 305 | TITLE 310 | MESSAGE ID 315 | PARENT ID 320 | POSTED TIME 325 | "ROOT" FLAG 330 | "DIRTY" FLAG 335 | "PLACE HOLDER" FLAG 340 |
|---|---|---|---|---|---|---|---|---|
| 1 | 200 | MESSAGE 7 | G | F | 1/2/98 08:00:00 | F | F | F |
| 2 | 200 | -- | F | E | -- | F | F | T |
| 3 | 200 | MESSAGE 5 | E | D | 1/4/98 08:02:00 | F | F | F |
| 4 | 200 | MESSAGE 4 | D | A | 1/4/98 08:01:00 | F | F | F |
| 5 | 200 | MESSAGE 8 | H | E | 1/3/98 08:00:00 | F | F | F |
| 6 | 200 | MESSAGE 1 | A | -- | 1/4/98 08:00:00 | T | F | F |

FIG. 7h

DATABASE
39

| 300 EID | 305 ARTICLE NO. | 310 TITLE | 315 MESSAGE ID | 320 PARENT ID | 325 POSTED TIME | 330 "ROOT" FLAG | 335 "DIRTY" FLAG | 340 "PLACE HOLDER" FLAG |
|---|---|---|---|---|---|---|---|---|
| 1 | 200 | MESSAGE 7 | G | F | 1/2/98 08:00:00 | F | T | F |
| 2 | 200 | MESSAGE 6 | F | E | 1/4/98 08:03:00 | F | T | F |
| 3 | 200 | MESSAGE 5 | E | D | 1/4/98 08:02:00 | F | F | F |
| 4 | 200 | MESSAGE 4 | D | A | 1/4/98 08:01:00 | F | F | F |
| 5 | 200 | MESSAGE 8 | H | E | 1/3/98 08:00:00 | F | F | F |
| 6 | 200 | MESSAGE 1 | A | – | 1/4/98 08:00:00 | T | F | F |

FIG. 7i

DATABASE
39

| 300 EID | 305 ARTICLE NO. | 310 TITLE | 315 MESSAGE ID | 320 PARENT ID | 325 POSTED TIME | 330 "ROOT" FLAG | 335 "DIRTY" FLAG | 340 "PLACE HOLDER" FLAG |
|---|---|---|---|---|---|---|---|---|
| 1 | 200 | MESSAGE 7 | G | F | 1/2/98 08:00:00 | F | F | F |
| 2 | 200 | MESSAGE 6 | F | E | 1/4/98 08:03:00 | F | F | F |
| 3 | 200 | MESSAGE 5 | E | D | 1/4/98 08:02:00 | F | F | F |
| 4 | 200 | MESSAGE 4 | D | A | 1/4/98 08:01:00 | F | F | F |
| 5 | 200 | MESSAGE 8 | H | E | 1/3/98 08:00:00 | F | F | F |
| 6 | 200 | MESSAGE 1 | A | – | 1/4/98 08:00:00 | T | F | F |

FIG. 7j

SYSTEM AND METHOD FOR USING A CLIENT DATABASE TO MANAGE CONVERSATION THREADS GENERATED FROM EMAIL OR NEWS MESSAGES

TECHNICAL FIELD

The present invention relates to communication and storage of electronic mail messages, and more particularly relates to managing conversation threads by using a client-based database.

BACKGROUND OF THE INVENTION

Electronic mail (e-mail) is one of the most commonly used applications for distributed computer networks. The benefits of e-mail applications are numerous. Users can quickly communicate with one another. If a user is not available to pick up a message immediately, the message is stored until that user can review the stored message at a later time. E-mail messages also provide a quick and easy way to package information such as sales reports, graphics, and other data for transfer to another user by simply attaching the information to the message. These days, business users increasingly rely on e-mail messages to share ideas, transmit documents, schedule meetings, and perform a multitude of other everyday tasks.

These tasks may be accomplished by a variety of software programs. For example, e-mail programs facilitate the transmission of messages between users. Messaging-enabled scheduling programs allow users to request and schedule meetings and appointments via electronic messages. Computer programs known as desktop information managers attempt to coordinate the growing stream of electronic communications by incorporating e-mail, a calendar, task management, contact management, notes, and journal features into a single application program.

The increased reliance on electronic messaging has resulted in a great increase in the number of electronic messages a user sends and receives daily. These messages can include news messages, as well as general mail messages. Users who send and receive a large number of e-mail messages would like an effective way to process their e-mail without spending a lot of time sorting through their in-box, deleting, filing, forwarding, and responding to their messages. Hence, a major problem with e-mail is that a user can become inundated with messages without an efficient and effective means to manage them, especially with respect to news messages.

Typically, news messages are formatted in a news conversation threading structure or tree structure, which is a conversation threading scheme used by some electronic message systems. This tree structure generally consists of complex message references with correspondingly unique message identifiers. In this conversation threading scheme, related news messages are grouped together forming a conversation. A conversation will generally consist of a conversation root and nested replies or reply messages. These nested replies or reply messages are commonly referred to as children of the conversation root. Based on the message references and identifiers, the tree structure is arranged so that the conversation can retain its original order. Specifically, the tree structure is arranged so that the conversation root is displayed first and reply messages are displayed thereafter in the order in which each is received. The tree structure also accommodates reply messages that stem from other reply messages and so forth. This form of conversation threading allows messages to be retrieved from a server in a logical order.

Other systems have managed conversation threading by generating a conversation index. The conversation index consists of a preamble for uniquely identifying the conversation root and additional parameters for each child of the conversation root. In this conversation threading scheme, a group of related messages making up a conversation generally have the same preamble. The parameters for related reply messages, whether a reply message is linked to the conversation root or another reply message, are derived from the conversation root. In this way, the group of related messages are linked to each other and message order can be maintained.

Oftentimes in these prior systems, the integrity of the message order can be difficult to maintain if all related messages are not retrieved at one time during a download operation between a server and a client. In addition, these systems generally must rethread all conversations after every download operation. These systems typically do not have a means for tracking messages so that message order can be maintained and messages do not have to be rethreaded.

Another problem resulting from prior systems using different conversation threading schemes is converting one conversation threading scheme to another. For example, some systems use a MAPI format, where messages stored in a local message store, such as a MAPI store, are threaded by generating a conversation index. The MAPI format cannot handle news messages, which are typically formatted in a tree structure. Not only are these systems unable to accommodate a news message in a tree structure, they do not have a means for converting the news message to a compatible conversation threading scheme.

Therefore, there is a need for a system that optimizes communication with electronic mail servers. There is also a need for a single mechanism for managing messages on a user's local message store. There is a need for a system that is able to accommodate news messages. In addition, there is a need for a system that effectively and efficiently keeps track of messages that are downloaded from a server to a client. Also, there is a need for a system that is able to maintain the message order of a threaded conversation. There is an additional need for a system that is able to convert one conversation threading scheme to another.

SUMMARY OF THE INVENTION

The present invention satisfies the above-described needs by providing a system and method for managing conversation threads communicated in a client-server architecture. Specifically, the present invention can generate conversation threading information for use in a MAPI format-sensitive application. Advantageously, the present invention efficiently manages messages and optimizes communication between a client and server by using a database, stored at the client. The database maintains a central archive of message-related information to support conversation threading of current and future messages downloaded from the server to the client. More particularly described, the present invention converts news conversation threading to a MAPI format for use in application programs which use a MAPI store.

The client-based database is used to support efficient management of conversations so that conversation roots (root messages) and nested replies (reply messages) are presented sequentially. Furthermore, the database includes data fields corresponding to specific fields of a typical MAPI format. The database also includes data fields to assist in providing more efficient and timely operation of retrieving and threading conversations from a local message store, such as a MAPI store.

The present invention generally operates within the environment of a distributed computer system including a server and a client, where the client includes a local message store and a database. The present invention can manage conversation threads based on message-related information for a message having a message identifier and a references field, where the message-related information is stored in the database. During a client-server session, the message-related information corresponding to the message is retrieved from the server. Based on the message-related information, a determination is made as to whether the message has been previously downloaded from the server to the local message store located at the client. In response to determining that the message has not been previously downloaded from the server to the local message store, the message is downloaded from the server to the local message store, and data fields in the database are populated with the message-related information. A determination then is made as to whether the references field of the message is empty. In response to determining that the references field of the message is empty, indications are provided in the database that the message is a conversation root and that a conversation index has not been determined for the message. This entire process is performed for each remaining message on the server during this client-server session. Finally, the conversation index is generated for each downloaded message based on the conversation root.

The message-related information generally comprises the message identifier for identifying the message, an article number for identifying the number of the article for the message, a title for identifying the title of the message, and a parent identifier for identifying the parent of the message. The message-related information also can include a posted or sent time for indicating a time and date that the message is posted to a database for news messages, preferably housed in a news server, such as an NNTP server. The data fields for the client-based database typically comprise a message identification field for the message identifier, an article number field for the article number, a title field for storing the title of the message, a parent identification field for storing the parent identifier for the message, and a posted time field for storing the time and date of the message.

In another aspect, the present invention can generate a conversation index based on message-related information for a reply message. Preferably, the reply message is arranged in a news conversation threading structure and includes a message identifier and a reference, which includes a message identifier for a root message. The message-related information can be stored in a client-based database and includes the message identifier and a time and date for the root message and the reply message. Advantageously, the conversation index, which includes fields that are arranged in the MAPI format, supports conversation threading so that the root message and the reply message are grouped in a MAPI format for use in a MAPI format-sensitive application. To generate a conversation index from a reply message, a value, preferably "1", is placed in a first field of the conversation index. The database then is consulted to obtain the time and date for the root message, the message identifier for the root message, and the time and date for the reply message. The time and date of the root message is stored in a second field of the conversation index. A unique identifier is generated based on the message identifier of the root message and is stored in a third field of the conversation index. The difference between the time and date of the reply message and the time and date of the root message is determined and stored in a fourth field of the conversation index. As a result, the conversation index represents the reply message in the MAPI format for use in the MAPI format-sensitive application.

Advantageously, the present invention optimizes communication with electronic mail servers by utilizing a client-based database. The present invention also accommodates news messages by converting the news messages to a conversation threading scheme that is compatible to MAPI format-sensitive applications. In addition, the present invention effectively and efficiently keeps track of messages that are downloaded from a server to a client and maintains the message order of a threaded conversation.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIGS. 4a and 4b are diagrams illustrating a conversation threading scheme for news messages known as a tree structure in accordance with an exemplary embodiment of the present invention.

FIGS. 4c and 4d are diagrams illustrating a generic conversion of the news messages in FIGS. 4a and 4b, respectively, to a MAPI formatted conversation index.

FIGS. 7a, 7b, 7c, 7d, 7e, 7f, 7g, 7h, 7i, and 7j, collectively referred to as FIGS. 7a–7j, are diagrams illustrating a message manager database for archiving messages for conversation threading operations in accordance with an exemplary embodiment of the present invention.

DETAILED DESCRIPTION

Figure 1:
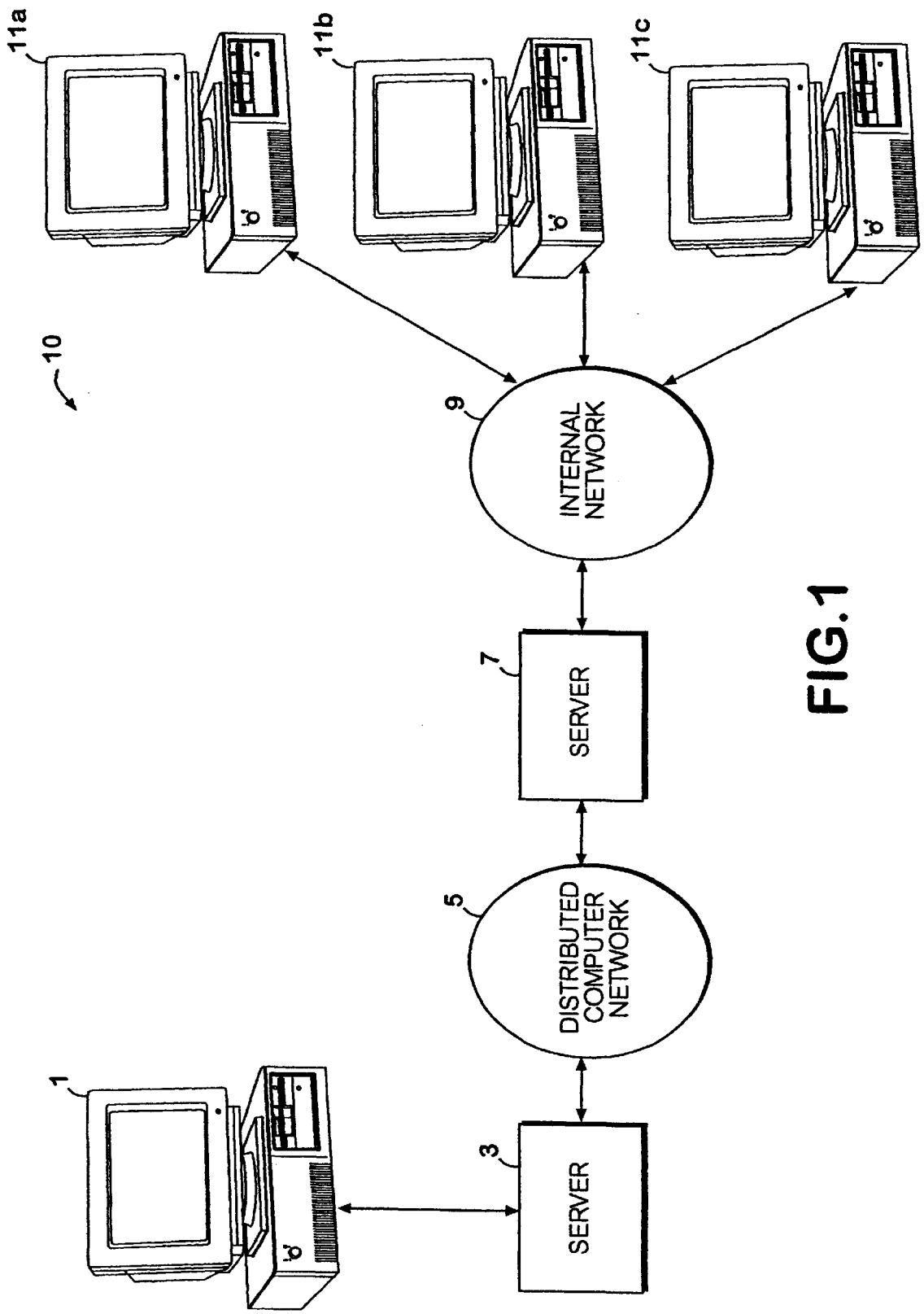
FIG. 1 is a block diagram of a client-server operating environment for an exemplary embodiment of the present invention.

Generally, the present invention provides a system for managing messages communicated within a client-server architecture, such as a distributed computing environment represented by a client and a server. Specifically, the present invention provides a system for managing conversation threads communicated in the client-server architecture. In an exemplary embodiment, the invention is incorporated into the "MICROSOFT OUTLOOK '98" application program, which is produced and distributed by Microsoft Corporation of Redmond, Wash. The "MICROSOFT OUTLOOK '98" application program can manage e-mail, calendars, contacts, tasks and to-do lists, and documents or files on a hard drive. The present invention, preferably implemented as a message manager program module ("message manager"), uses a database, stored at the client, to maintain a central archive of message-related information to support conversation threading of current and future messages downloaded from the server to the client. The present invention also converts news messages in a news conversation threading structure to a MAPI format for use in application programs which use a MAPI store.

Referring now to the drawings, in which like numerals represent like elements throughout the several figures, aspects of the present invention and an exemplary operating environment will be described.

EXEMPLARY OPERATING ENVIRONMENT

The following discussion is intended to provide a general description of a suitable computing environment in which the invention may be implemented. While the invention will be described in the general context of an application program that runs on an operating system in conjunction with a personal computer and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

The Internet uses a message standard, known as a Simple Mail Transfer Protocol (SMTP), which works in conjunction with a user's e-mail program and defines the control messages used by two computers to exchange e-mail messages. Such controls include verification of proper connection, identification of sender, negotiation of transmission parameters, and message transmission. SMTP is responsible for 1) sending mail created by a local user to another computer and 2) receiving mail from other computers on the network and transferring it to the local user's e-mail program.

Typically, the computers connected to a wide area network such as the Internet are identified as either servers or clients. A server is a computer that stores files that are available to the other computers connected to the network. For example, an e-mail server manages message traffic and mail boxes for users, in addition to translation facilities or gateways that allow message exchange between different types of e-mail programs. A client is a computer connected to the network that accesses shared resources provided by a server. To obtain information from a server, a client makes a request for a file or information located on the server using a specified protocol. Upon reception of a properly formatted request, the server downloads the file or information to a local message store located at the client.

FIG. 1 illustrates a typical client-server environment 10 in which an exemplary embodiment of the present invention operates. A computer system or client 1, such as a conventional personal computer or any device operable to communicate over a network, is connected to an Internet server computer 3 ("server"). The server 3 is generally provided by an Internet service provider (ISP), which provides Internet access for a typical Internet user. The server 3 is connected to a distributed computer network 5, such as the Internet, and enables the client 1 to communicate via the distributed computer network 5.

The client 1 communicates via the combination of the server 3 and the distributed computer network 5 to a server 7, such as a communication or an e-mail server. In an exemplary embodiment, servers 3 and 7 support e-mail services, contain a message store for holding messages until delivery, and contain a translation facility or gateway for allowing users having different e-mail programs to exchange mail. The server 7 is connected to an internal network 9 and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. The information is retrieved by the server 3 and can be forwarded to the client 1, when requested by the client 1.

Figure 2:
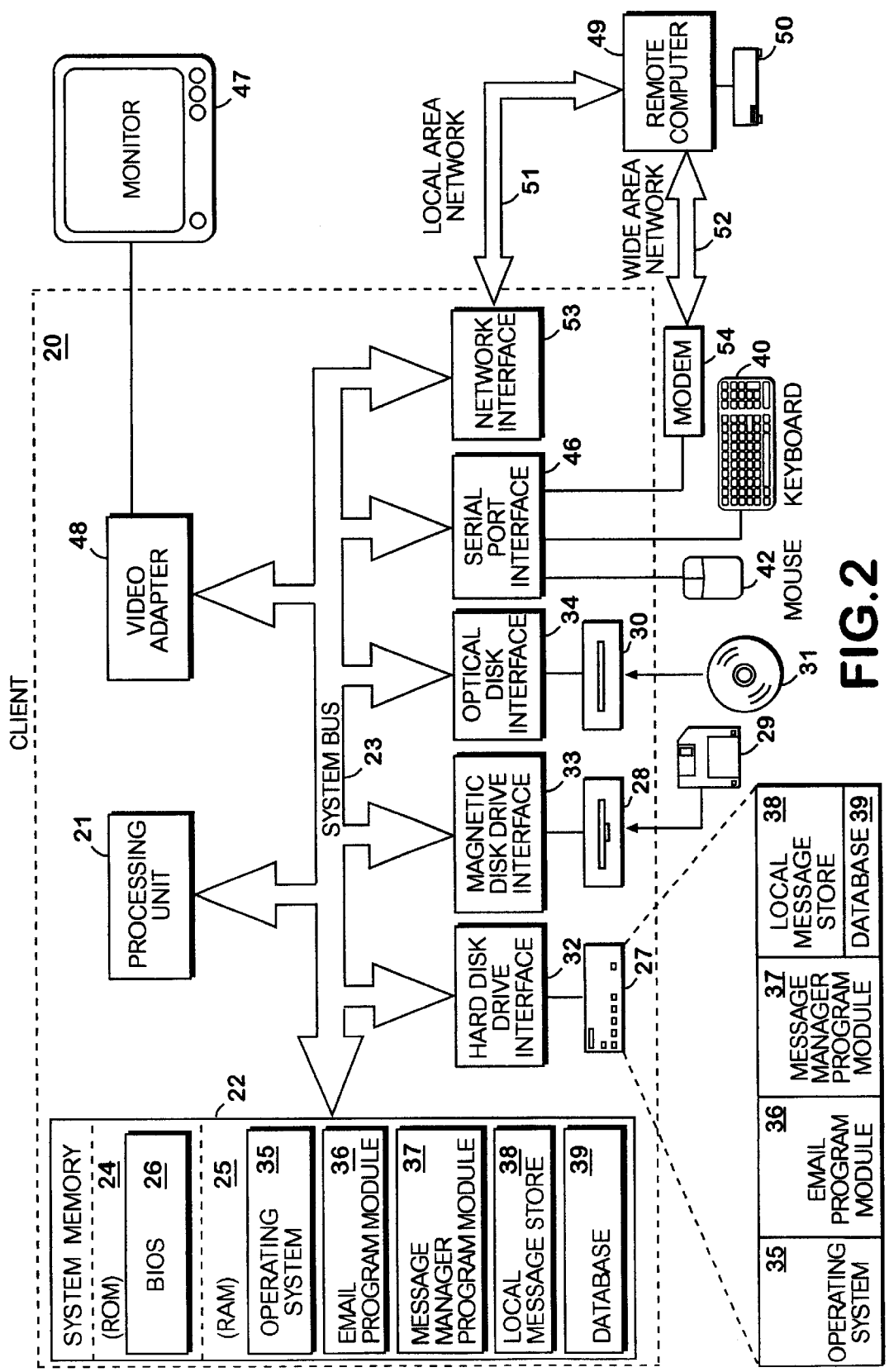
FIG. 2 is a block diagram of a client system for an exemplary embodiment of the present invention.

With reference to FIG. 2, an exemplary system for implementing the invention includes a conventional personal computer 20, which serves as a client. The client 20 may represent any or all of the clients 1, 11a, 11b, and 11c illustrated in FIG. 1. The client 20 includes a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the client 20, such as during START-up, is stored in ROM 24. The client 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the client 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an e-mail program module 36, other program modules, such as a message manager program module 37, a local message store 38, and a database 39 for supporting e-mail applications. A user may enter commands and information into the client 20 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The client 20 operates typically in a networked environment using logical connections to one or more remote computers, such as a remote computer 49. The remote computer 49 may be an e-mail server (which includes one or more message stores), as described above in connection with FIG. 1, a file server (which includes one or more file stores), a router, a peer device or other common network node, and typically includes many or all of the elements described relative to the client 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the client 20 is connected to the LAN 51 through a network interface 53. When used in a WAN networking environment, the client 20 typically includes a modem 54 or other means for establishing communications over the WAN 52, such as the Internet. The modem 54, which may be internal or external, is connected to the system bus 23 via the serial port interface 46. In a networked environment, program modules depicted relative to the client 20, or portions thereof, may be stored in the remote memory storage device. It will be appreciated that the network connections shown are exemplary and other means of establishing a communications link between the computers may be used.

Figure 3:
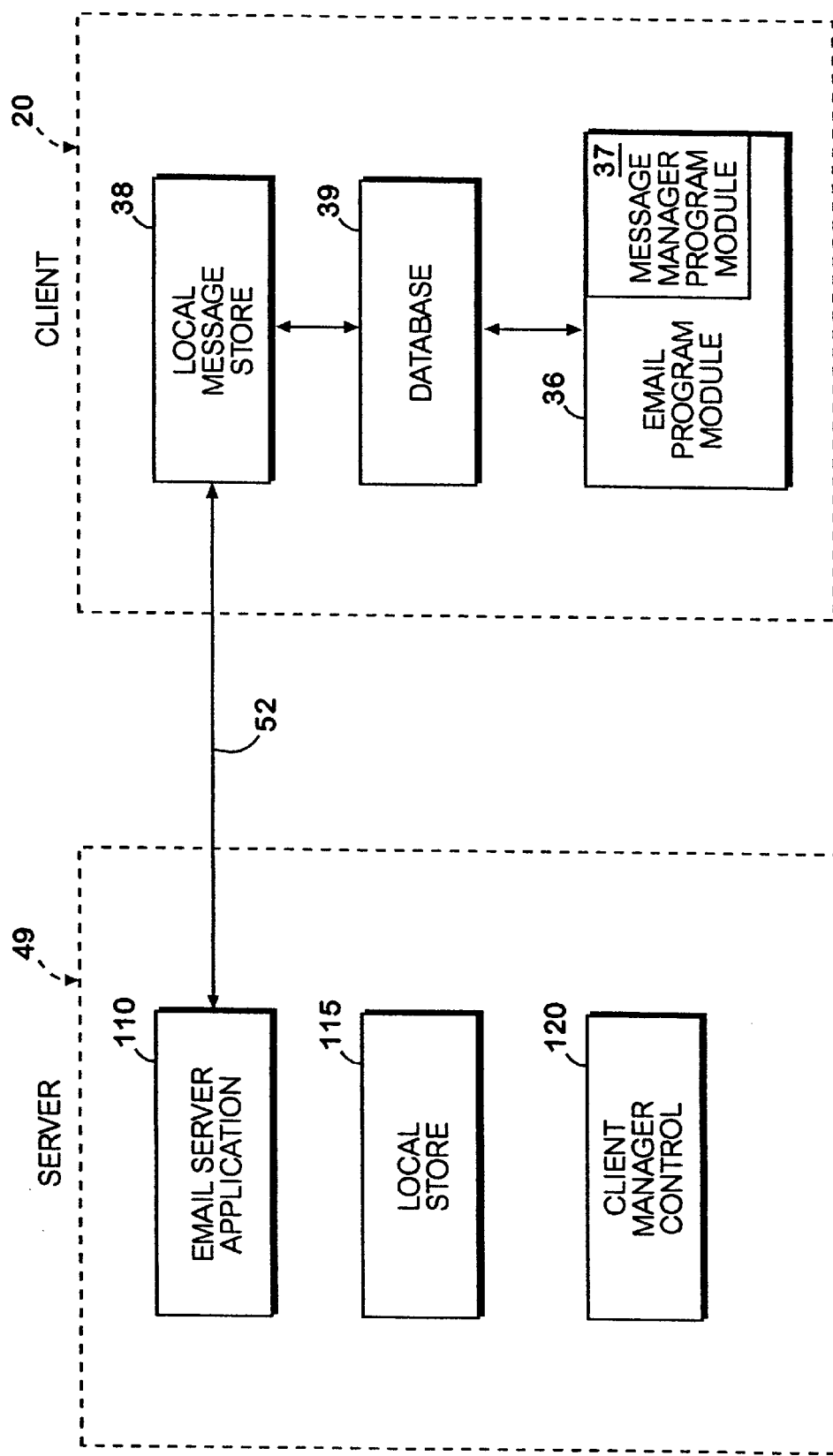
FIG. 3 is a block diagram illustrating inter-operation of a client and server in accordance with an exemplary embodiment of the present invention.

With continuing reference to FIGS. 1 and 2, FIG. 3 is a diagram illustrating inter-operation of a client and server in accordance with an exemplary embodiment of the present invention. This exemplary embodiment is embodied in the "MICROSOFT OUTLOOK '98" application program, which is published by Microsoft Corporation of Redmond, Wash. The program helps users communicate through e-mail, phone support and group scheduling capabilities, and allows users to create and view information using a consistent interface. The "MICROSOFT OUTLOOK '98" program supports an exemplary program module, namely a message manager program module 37, for managing messages. The "MICROSOFT OUTLOOK '98" program also supports various Internet protocols, including, but not limited to protocols known in the art such as Internet Message Access Protocol (IMAP), version 3.0 of Post Office Protocol (POP3), Simple Mail Transfer Protocol (SMTP), Multipurpose Internet Mail Extensions (MIME), and Hyper Text Markup Language (HTML), and Network News Transfer Protocol (NNTP).

In FIG. 3, a remote computer 49 operates as a server and generally includes an é-mail server application 110, a local store 115, and a client manager control 120. In an exemplary embodiment, the remote computer 49, also described as a server, is a POP3 mail server, but it will be appreciated that the present invention is not limited to this type server. In the exemplary embodiment, the client 20 includes a local message store 38, a database 39, an e-mail program module 36, and a message manager program module 37 for facilitating message management and operation of the database 39.

With respect to the exemplary embodiment, the client 20 provides two modes of operation in connection with the server 49. These modes are a default mode and a "leave on server" mode. In the default mode, the client 20 sends a delete command to the server 49 to delete a message from the server 49 after the message has been downloaded to the client 20. In the "leave on server" mode, the client does not send a delete command to the server 49 after the message has been downloaded to the client 20, thereby allowing the message to remain on the server 49 although the message has been downloaded. The mode of operation generally is selected based on user-preference. Advantageously, an exemplary embodiment of the present invention optimizes the management of messages when the client 20 is in the "leave on server" mode, which is the preferred mode of operation for purposes of this discussion.

The server 49 houses e-mail messages from clients in the local store 115 while awaiting transmission to an appropriate destination. The e-mail server application 110 forwards messages over the WAN 52 from a sender client (not shown) to the client 20, upon request by the client 20. The client manager control 120 is a program used to set up computer systems, such as clients 1, 11a, 11b, 11c (FIG. 1), and 20 (FIG. 2) on the network. The client manager control 120 can also specify the addresses of the computer systems located on the network. In addition, the client manager control 120 typically facilitates the management of incoming and outgoing messages on the server. When a request for a message is made by the client 20 to the server 49, the e-mail server application 110 on the server 49 responds by retrieving the message from the local store 115 on the server 49 and by transmitting the message over the WAN 52 to the client 20. The message is then downloaded into the local message store 38 located at the client 20. The local message store 38 houses all downloaded messages from the server 49.

There are essentially two types of e-mail messages that are usually downloaded from the server 49 to the client 20. These message types are news messages and general mail messages. Although the present invention efficiently manages both types of messages, this embodiment of the present invention specifically addresses managing news messages.

News messages generally include items such as articles, bulletins, information, and data that are distributed to Internet users or subscribers through direct mailing on the Internet and through the USENET news system. The USENET news system provides a central repository of news messages in a database (not shown) and allows a subscriber to select those items he or she desires to read. The database (not shown) preferably is housed in a news server (not shown), such as an NNTP server. NNTP specifies the protocol for the distribution, inquiry, retrieval, and posting of news messages. NNTP is designed so that news messages can be stored at a central database at one host and can be accessed by subscribers from remote locations.

An application program, such as the "MICROSOFT OUTLOOK '98" program, provides a user-friendly interface for facilitating interaction with the database (not shown) for the news messages. The server 49 serves as an interface between the database for the news messages and the application program. Unfortunately, due to the conversation threading scheme for news messages, an application program that is MAPI format-based cannot handle downloading these news messages and maintaining their order. Consequently, an exemplary embodiment of the present invention provides the benefit of converting the conversation threading scheme of news messages to a conversation threading scheme that can be managed by a MAPI format-sensitive application.

This exemplary embodiment efficiently manages news messages and optimizes communication between a client and server by using a database, stored at the client. The database maintains a central archive of message-related information to support conversation threading of news messages downloaded from the server to the client. The database includes data fields corresponding to specific fields of a typical MAPI format. The database also includes data fields to assist in providing more efficient and timely operations of retrieving and threading conversations from a local message store, such as a MAPI store.

With continuing reference to FIGS. 1–3, FIGS. 4a and 4b illustrate a conversation threading scheme for news messages known as a tree structure. The tree structure is a common format for news messages. For purposes of this discussion, news messages are referred to herein as simply "messages". FIGS. 4a and 4b are used as examples of a simple case and a complex case, respectively, and are referred to throughout this discussion to demonstrate operation of an exemplary embodiment of the present invention in connection with FIGS. 6a and 6b and FIGS. 7a–7j.

Each message usually includes a message identifier or ID and a references field. The message ID is a identification string, which typically is derived from a header of the message itself, that uniquely identifies the message. For purposes of this discussion, a message ID is represented as a single character for simplicity. The references field identifies other correspondence which the message references. Specifically, the references field lists message IDs of any messages prompting the submission of the message. The purpose of the references field is to allow messages to be grouped into conversations by a program module, such as an application program or a browser. A message that does not have any references in its references field is a conversation root or root message. As used herein, the terms "conversation root" and "root message" are interchangeable and represent an original message having no references. A message that has references in its references field may be referred to as a reply message. The message may also include a message title, an article number, and other items that are described in connection with FIGS. 5–12.

In FIG. 4a, a simple tree structure is illustrated for a group of messages associated with article number 100. In row 100, Message 1 has a message ID "A" and no references in its references field. Moreover, Message 1 is a conversation root. In row 102, Message 2 has a message ID "B" and a references field consisting of <A>. In row 104, Message 3 has a message ID "C" and a references field consisting of <A><B>. In row 106, Message 4 has a message ID "D" and a references field consisting of <A>.

Assuming that each message ID represents a message, the messages are typically linked in a tree-like format based on the contents of the references fields, as illustrated in FIG. 4a. Specifically, Message 1 is directly linked to Message 2 and Message 4, and Message 2 is directly linked to Message 3.

In FIG. 4b, a more complex tree structure is illustrated for a group of messages associated with article number 200. In row 110, Message 1 has a message ID "A" and no references in its references field. Moreover, Message 1 is a conversation root. In row 112, Message 2 has a message ID "B" and a references field consisting of <A>. In row 114, Message 3 has a message ID "C" and a references field consisting of <A><B>. In row 116, Message 4 has a message ID "D" and a references field consisting of <A>. In row 118, Message 5 has a message ID "E" and a references field consisting of <A><D>. In row 120, Message 6 has a message ID "F" and a references field consisting of <A><D><E>. In row 122, Message 7 has a message ID "G" and a references field consisting of <D><E><F>. In row 124, Message 8 has a message ID "H" and a references field consisting of <A><D><E>.

As illustrated in FIG. 4b, Message 1 is directly linked to Message 2 and 4; Message 2 is directly linked to Message 3; Message 4 is directly linked to Message 5; Message 5 is directly linked to Message 6 and Message 8; and Message 6 is directly linked to Message 7.

Advantageously, the exemplary embodiment converts the tree structures illustrated in FIGS. 4a and 4b into a MAPI format conversation index shown in FIGS. 4c and 4d, where FIG. 4c corresponds to FIG. 4a and where FIG. 4d corresponds to FIG. 4b. FIGS. 4c and 4d, used as examples of a simple case and a complex case, respectively, are referred to throughout this discussion to demonstrate operation of the exemplary embodiment in connection with FIGS. 6a and 6b and FIGS. 7a–7j.

Figures 5, 6A, 6B:
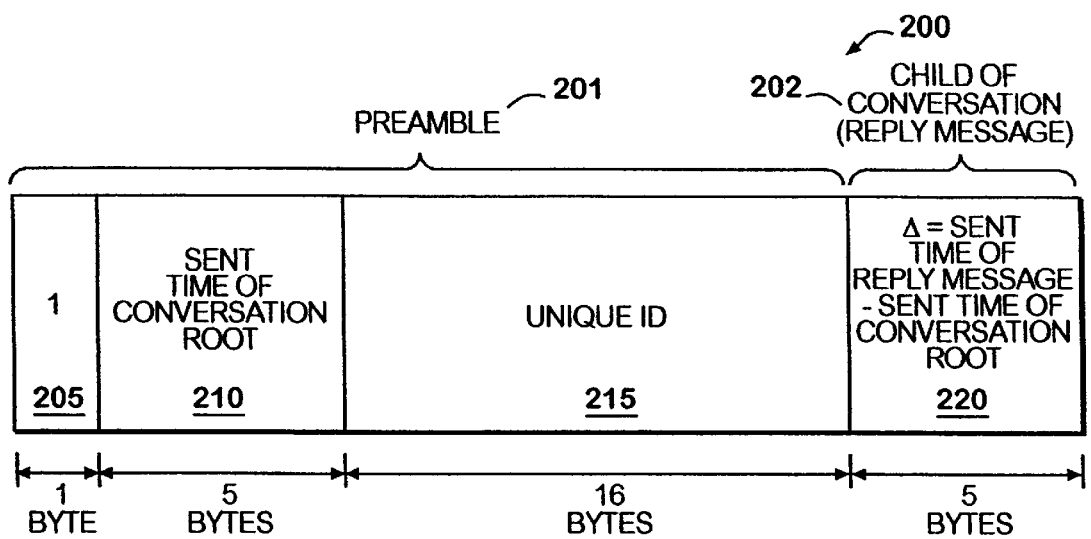
FIG. 5 is a diagram of a MAPI-formatted conversation index generated from message-related information maintained in a client-based database in accordance with an exemplary embodiment of the present invention.
FIGS. 6a and 6b are diagrams illustrating a message manager database for archiving messages for conversation threading operations in accordance with an exemplary embodiment of the present invention.

With continuing reference to FIGS. 4c and 4d and turning to FIG. 5, a diagram illustrating a conversation index in accordance with an exemplary embodiment of the present invention is described. A conversation index 200, also known as a PR_Conversation_Index, is a conversation threading format used in a MAPI store. If the message is a reply message, the conversation index 200 typically includes a preamble 201 and a child of conservation 202. However, if the message is a conversation root, the conversation index 200 only includes the preamble 201. Once a preamble is generated for a conversation root, a conversation index can be generated for all reply messages having the same conversation root. The preamble of the conversation index 200 is common to all reply messages having the same conversation root, as shown in FIGS. 4c and 4d. Advantageously, an exemplary embodiment of the present invention stores message-related information for generating a conversation index in the client-based database 39.

The conversation index 200 contains fields 205, 210, 215, and 220. In MAPI format, the size of the fields are as follows: the first field 205 is one byte; the second field 210 is five bytes; the third field is sixteen bytes; and a fourth field or reply message field 220 is five bytes. It is understood by those skilled in the art that a conversation index can have more than one reply message field, as illustrated in FIGS. 4c and 4d.

Fields 205, 210, and 215 make up the preamble. Preferably, a value of "1" is placed in the first field 205. The second field 210 is populated with the sent time of the conversation root. The sent time is the time and date that a message is sent to a database for news messages, preferably housed in a news server. The third field 215 is populated with a unique identifier or ID for the conversation root. The unique ID is generated from the message ID of the root message using a "hashing" process, which converts the arbitrary length message ID to a fixed length unique ID.

Finally, if a message is a reply message, the message has at least one reply message field 220. The reply message field 220 is populated with a difference "delta" equal to the difference between the sent time of the reply message and the sent time of the conversation root.

Each child of conversation 202 represents the reply message and each reference, except for the reference for the root message, in the references field of the reply message. For example, turning briefly to FIG. 4d, the conversation index 124a for Message 8 has a preamble derived from a root message (message ID "A") and three children of the conversation derived from each reference, message ID "D" and message ID "E", as well as the reply message itself, message ID "H".

For a place holder that is a conversation root, a preamble is generated by using a message ID from the references field of a different message. In addition, the sent time for a place holder is an arbitrary date and time in the past. Once the conversation index for a place holder conversation root is generated, a conversation index for a related message can also be generated. Place holders will be described in greater detail in connection with FIGS. 6–11.

In view of the foregoing, the present invention provides the benefit of threading conversations without complex referencing schemes like a tree structure. Furthermore, the present invention provides an efficient process for converting a tree structure to a MAPI format for use in a MAPI store. Moreover, by converting a message to the MAPI format, missing messages do not ruin the message order, as can occur in systems that use a tree structure. Additional features and advantages of the present invention are described in connection with the download operation and use of the database for storing message-related information for managing conversation threads.

During the download operation, data fields are populated within the database 39 with message-related information for conversation threading in association with the downloaded message. The information includes an article number for identifying the article, a message identifier for uniquely identifying the message, a message title for identifying the title of the message, and other message-related information that will be described in greater detail herein below with respect to FIGS. 6–11. The e-mail program module 36 provides facilities for creating, addressing, sending, receiving, and forwarding messages, while the message manager program module 37 manages messages during download and conversation threading operations utilizing the database 39.

In prior systems, messages are typically rethreaded each time messages are downloaded. An exemplary embodiment of the present invention solves this problem by utilizing the database to keep track of downloaded messages and conversation threading information. The use of the database 39 is described in greater detail in connection with FIGS. 6a and 6b, collectively described as FIG. 6, and FIGS. 7a–7j, collectively described as FIG. 7.

With continuing reference to FIGS. 1–5, FIGS. 6a and 6b and FIGS. 7a–7j illustrate a client-based database for archiving messages relating to conversation threading in accordance with an exemplary embodiment of the present invention.

The database 39 can include multiple data fields, organized within an array structure, for maintaining message-related information. To support download and conversation threading operations, typical data fields of the database include: an entry identification (EID) 300, an article number 305, a title 310, a message identification (message ID) 315, a parent identification (parent ID) 320, a posted time 325, a "root" flag 330, a "dirty" flag 335, and a "place holder" flag 340.

Operation of the database 39 in connection with the message manager program module 37 (FIG. 3) is presented by way of two representative examples. The first example is a simple case in which a root message and reply messages are downloaded during a single client-server session. This example is illustrated in FIGS. 6a and 6b with continuing reference to FIGS. 3, 4a, and 4c. In this example, a connection is made between a client 20 (FIG. 3) and server 49 (FIG. 3). A user desires to check her download news messages and is typically prompted by the e-mail program module 36 (FIG. 3) to enter a password for access to the messages.

The server 49 contains four messages in its local store 115. These messages are entitled Message 1, Message 2, Message 3, and Message 4, as shown in FIG. 4a. Message 1 has no reference in its references field and has a message ID "A". Message 2 has a references field consisting of <A>and has a message ID "B". Message 3 has a references field consisting of <A><B>and has a message ID "C". Message 4 has a references field <A>and has a message ID "D".

Referring to FIG. 6a, the client 20 transmits a command to retrieve a message ID for a message. The server responds by transmitting to the client a message ID "A". As previously mentioned in connection with FIG. 4a, the message having a message ID "A" is a conversation root and, consequently, the message has no reference in its references field. The client checks the database 39 to determine whether there are any message entries having the message ID "A". In this example, there are no message entries having this message ID. As a result, the associated message is downloaded in the local message store 38, which in this case is a MAPI store.

During download operations, data fields 300, 305, 310, 315, 320, 325, 330, 335, and 340 within the database 39 are populated with message-related information associated with the message. Specifically, an entry identifier is populated in an EID field 300, an article number is populated in an article number field 305, a title is populated in a title field 310, the message ID is populated in a message ID field 315, a parent ID is populated in a parent ID field 320, and a time and date or sent time are populated in a posted time field 325. In this representative example, the message-related information for a message entry associated with the message having a message ID of "A" includes: EID "1", article number "100", title "Message 1", message ID "A", and posted time "Jan. 1, 1998 08:00:00". As previously mentioned, the message is a conversation root. Therefore, the message does not have a parent ID, as shown in FIG. 6a, and a "root" flag is set to a true state in the "root" flag field 330.

The "root" flag exists in two states, namely a true state and a false state. The true state serves as an indicator that the message is a conversation root. The false state serves as an indicator that the message is not a conversation root. The message manager 37 keeps track of which messages are root messages for generating conversation indices. Once a conversation index is generated for a root message, reply messages that depend from the root message can be organized easily and efficiently.

In response to downloading the message to the local message store 38, a "dirty" flag is set to a true state in the "dirty" flag field 335. The "dirty" flag also exists in a true state and a false state. The true state of the "dirty" flag is indicative of a message that does not have a conversation index set in the local message store. The true state of the "dirty" flag is also indicative of the message being "dirtied" because a conversation index of another message from which the message depends has not been set or has become "dirtied". The false state of the "dirty" flag serves as an indicator that a conversation index has been generated for the message.

Further in response to downloading the message, a "place holder" flag is set to a false state in the "place holder" flag field 340. A place holder also exists in a true state and a false state. The true state serves as an indicator that the message is a place holder. The false state serves as an indicator that the message is not a place holder. Specifically, a place holder is a message entry for a message that has not yet been downloaded, which is referred to herein as a "non-downloaded message". The message manager is aware of a message's existence if a message ID for the non-downloaded message is referenced in a references field of an already downloaded message. Consequently, the message manager sets up a place holder to reserve a place for the non-downloaded message in the database. Any information about the non-downloaded message that can be gleaned from the already downloaded message is stored in appropriate data fields in the database as an incomplete message entry. If or when the non-downloaded message is downloaded to the client 20, the remaining data fields for the incomplete message entry are populated with the appropriate information. In this example, the place holder is set to a false state because the message has been downloaded and the message entry for the message is complete.

Referring to FIG. 6a, once Message 1 has been downloaded and the appropriate data fields have been populated, the message manager 37 determines whether there are any more messages to be downloaded from the server 49 to the client 20. In this example, there are three messages remaining on the server 49. The next message ID is retrieved and the downloading process is repeated, where a determination is made as to whether the message ID matches any message IDs in the database 39. The entire process is repeated for each of the remaining messages on the server.

In this example, Message 2 is downloaded and the data fields 300, 305, 310, 315, 320, 325, 330, 335, and 340 within the database 39 are populated with message-related information associated with the message. The message-related information for a message entry associated with the message having a message ID of "B" includes: EID "2", article number "100", title "Message 2", message ID "B", parent ID "A", and posted time "Jan. 1, 1998 08:01:00". The "root" flag is set to a false state in the "root" flag field 330 because Message 2 is not a conversation root and depends from Message 1, as shown in FIG. 4a. Also, a "dirty" flag for Message 2 is set to a true state in the "dirty" flag field 335. In addition, a "place holder" flag is set to a false state in the "place holder" flag field 340.

It will be appreciated by those skilled in the art that in a tree structure format, the parent ID is typically the last referenced message ID in the references field of the message. In addition, the parent ID is preferably an internal pointer for pointing to the last referenced message ID. However, for purposes of this discussion, a single character is used to represent the parent ID for simplicity.

Next, Message 3 is downloaded and the data fields 300, 305, 310, 315, 320, 325, 330, 335, and 340 within the database 39 are populated with message-related information associated with the message. The message-related information for a message entry associated with the message having a message ID of "C" includes: EID "3", article number "100", title "Message 3", message ID "C", parent ID "B", and posted time "Jan. 1, 1998 08:02:00". The "root" flag is set to a false state in the "root" flag field 330 because Message 3 is not a conversation root and depends from Message 2, as shown in FIG. 4a. Also, a "dirty" flag for Message 3 is set to a true state in the "dirty" flag field 335, and a "place holder" flag is set to a false state in the "place holder" flag field 340.

Referring again to FIG. 6a, Message 4 is downloaded and the data fields 300, 305, 310, 315, 320, 325, 330, 335, and 340 within the database 39 are populated with message-related information associated with the message. The message-related information for a message entry associated with the message having a message ID "D" includes: EID "4", article number "100", title "Message 4", message ID "D", parent ID "A", and posted time "Jan. 1, 1998 08:03:00". The "root" flag is set to a false state in the "root" flag field 330 because Message 4 is not a conversation root and depends from Message 1, as shown in FIG. 4a. Also, a "dirty" flag for Message 4 is set to a true state in the "dirty" flag field 335, and a "place holder" flag is set to a false state in the "place holder" flag field 340.

After all of the messages have been downloaded and the data fields have been populated, the message manager 37 generates a conversation index for each message entry having a "dirty" flag set to a true state. Generation of a conversation index is described in greater detail below in connection with FIG. 12. The conversation index for a conversation root is generated first because other messages may depend on the conversation root and share a common preamble, which is based on the conversation index of the conversation root. For example, referring back to FIG. 4a, Message 2 102, Message 3 104, and Message 4 106, all depend from Message 1 100. Hence, referring to FIG. 4c, the preamble for each message consists of information derived from Message 1 having a message ID "A".

Referring again to FIG. 6a, in this example, the conversation root is Message 1 based on the fact that the "root" flag is set to a true state in the database 39. As a result, the conversation index for Message 1 is generated in a MAPI conversation threading scheme similar to the one shown for Message 1 100a in FIG. 4c and previously -described in connection with FIG. 5. After this conversation index is generated, the conversation indices for the reply messages, namely Message 2, Message 3, and Message 4, are generated. The reply messages maintain a conversation threading scheme similar to the structures 102a, 104a, and 106a illustrated in FIG. 4c.

After all of the conversation indices are generated, the conversation indices are stored in the local message store 38 in connection with the appropriate messages. Also, the "dirty" flags then are set to a false state to indicate that the conversation indices are set for the messages, as shown in FIG. 6b. The client-server session is completed and discontinued.

Advantageously, an exemplary embodiment of the present invention provides means for efficiently managing threaded conversations. A database is consulted during download operations to determine if message entries exist for downloaded messages, and if not, message entries are created for those messages that are not already entered in the database. The database is used to create and manage threaded conversations. Moreover, if any data changes with respect to the messages, such as a message becoming dirtied, the database is updated to reflect those changes so that information in the MAPI store remains in synchronization with server information. A conversation index is created for each message entry so that messages like those provided in news groups can operate in a MAPI format and be used in a software environment, like that of the "MICROSOFT OUTLOOK '98" program. Advantageously, the conversation index is updated only when necessary, thereby minimizing the amount of changes made in the MAPI store.

These features and advantages can be further appreciated by way of a second representative example. The second example is a more complex case in which a root message and reply messages are downloaded during several client-server sessions. This example is illustrated in FIGS. 7a–7j with continuing reference to FIGS. 3, 4b, and 4d. In this example, a connection is made between a client 20 (FIG. 3) and server 49 (FIG. 3). A user desires to check her download news messages and is typically prompted by the e-mail program module 36 (FIG. 3) to enter a password for access to the messages.

In this example, assume there are four client-server sessions. In a first client-server session, there is only one message, namely Message 7, on the server 49 to be downloaded to the client 20. As shown in FIG. 4b, Message 7 has a references field consisting of <D><E><F>and has a message ID "G". In a second client-server session, there is only one message, namely Message 8, to be downloaded from the server 49 to the client 20. In FIG. 4b, Message 8 has a references field consisting of <A><D><E>and has a message ID "H". In a third client-server session, there are three messages to be downloaded. Referring still to FIG. 4b, these messages include: Message 1 having no references in its reference field and having a message ID "A"; Message 4 having a references field consisting of <A>and having a message ID "D"; and Message 5 having a references field consisting of <A><D>and having a message ID "E". Finally, in a fourth client-server session, there is only one message to be downloaded, namely Message 6, which has a references field consisting of <A, D, E>and has a message ID "F".

Turning to FIG. 7a, in the first client-server session, the client 20 transmits a command to retrieve a message ID for a message. The server responds by transmitting to the client a message ID "G". The client checks the database 39 to determine whether there are any message entries having the message ID "G". In this example, there are no message entries having this message ID. As a result, the associated message, in this case Message 7, is downloaded in the local message store 38.

In response to downloading the message, the data fields 300, 305, 310, 315, 320, 325, 330, 335, and 340 within the database 39 are populated with message-related information associated with the Message 7. This information includes: EID "1", article number "200", title "Message 7", message ID "G", parent ID "F", and posted time "Jan. 2, 1998 08:00:00". As previously mentioned in connection with FIGS. 6a and 6b, the parent ID is typically the last referenced message ID in the references field of the message. In this case, Message 7 has a references field consisting of <D><E><F>and the last referenced message ID is "F". Hence, the message having a message ID "F" is the parent ID for Message 7. The "root" flag is set to a false state in the "root" flag field 330 because Message 7 is not a conversation root and depends from Message 6, as shown in FIG. 4a. Also, a "dirty" flag for Message 7 is set to a true state in the "dirty" flag field 335. In addition, a "place holder" flag is set to a false state in the "place holder" flag field 340.

Due to the fact that Message 7 has references, a determination is made as to whether each referenced message ID matches a message ID in the message ID field 315 in the database. The determination is made by checking the last referenced message ID first and proceeding from right to left in the references field for the message. If there is a match, the message having the referenced message ID has already been downloaded. On the other hand, if there is not a match, the associated message has not been downloaded. Hence, a place holder is created for the referenced message ID. Any information about the non-downloaded message that can be obtained from the already downloaded message is stored in appropriate data fields in the database as an incomplete message entry.

In this example, the last referenced message ID is "F" for Message 7. This message ID is not already found in the database 39. Therefore, a place holder is created for the non-downloaded message. Based on the message-related information for Message 7 in the database, the place holder includes: EID "2", Article number "200", message ID "F", and parent ID "E". The parent ID is preferably determined by checking the next referenced message ID, from right to left, in the references field of Message 7. This method of determining the parent ID is generally reliable because there is a presumption that all of the messages are referenced in the references field and that the message IDs are presented in order. The "root" flag is set to a false state because the message has a parent ID. The "dirty" flag is set to a true state, and the "place holder" flag is set to a true state. This procedure is executed for each referenced message ID in the references field of the message.

In FIG. 7a, a place holder is created for message ID "E". The place holder includes: EID "3", Article number "200", message ID "E", and parent ID "D". The "root" flag is set to a false state; the "dirty" flag is set to a true state; and the "place holder" flag is set to a true state. In addition, a place holder is created for message ID "D". The place holder includes: EID "4", Article number "200", message ID "D", and no parent ID. The message manager determines that the message having message ID "D" is a conversation root because there are no more referenced messages. As a result, the "root" flag is set to a true state. In addition, the "dirty" flag is set to a true state, and the "place holder" flag is set to a true state.

After the message has been downloaded and the message-related information is populated in the database 39, the message manager 37 generates a conversation index for each message entry having a "dirty" flag set to a true state. The conversation root preferably is generated first. In this example, the conversation root is the message having the message ID "D" as noted by the "root" flag in the database 39. The conversation index 116*a* (FIG. 4*d*) is generated for the message having the message ID "D". Once the conversation index for the conversation root is generated, the message manager 37 methodically determines which conversation index to generate next based on a message entry's dependency on the conversation root. In other words, the message manager 37 preferably checks the parent ID field 320 to determine which message entries directly depend from the conversation root and generates the conversation index for those message entries. Based on those message entries, the message manager 37 checks the parent ID field 320 for the next message entries and generates the conversation index for the next message entries. This process continues until all conversation indices have been generated for message entries having a "dirty" flag set to a true state.

In this example, the message entry having the message ID "E" depends directly from message ID "D". As a result, the conversation index 118*a* (FIG. 4*d*) for message ID "E" is generated. Next, the message entry having the message ID "F" depends directly from message ID "E". So, the conversation index 120*a* (FIG. 4*d*) for message ID "F" is generated. Finally, the message entry having the message ID "G" depends directly from message ID "F". So, the conversation index 122*a* (FIG. 4*d*) for message ID "E" is generated.

After all of the conversation indices are generated, the conversation indices are stored in the local message store 38 in connection with the appropriate messages. Also, the "dirty" flags then are set to a false state to indicate that the conversation indices are set for the messages, as shown in FIG. 7*b*.

Referring to FIG. 7*c*, in the second client-server session, there is only one message, namely Message 8, to be downloaded from the server 49 to the client 20. In FIG. 4*b*, Message 8 has a references field consisting of <A><D><E>and has a message ID "H". The message is downloaded and data fields are populated in a similar manner as previously described in connection with FIG. 7*a*. However, in this example, the message entry includes: EID "5", article number "200", title "Message 8", message ID "H", parent ID "E", and posted time "Jan. 3, 1998 08:00:00". A "dirty" flag is set to a true state for the message, and a "place holder" flag is set to a false state for the message entry. As noted, the parent ID is the last referenced message ID in the references field.

As previously mentioned, the message manager checks each referenced message ID to determine whether there is a match in the database 39. In this example, the last referenced message ID "E" is already located in the database 39, thereby indicating that the message entry is either a place holder or the message has already been downloaded. The message manager 37 checks the next referenced message ID "D". Message ID "D" is also already located in the database 39. The message manager 37 then checks the next referenced message ID "A". Message ID "A" is not found in the database, and therefore, a place holder is created for message ID "A". The place holder includes: EID "6", Article number "200", message ID "A", and no parent ID. The message manager 37 determines that the message having message ID "A" is a conversation root because there are no more referenced messages. As a result, the "root" flag is set to a true state. In addition, the "dirty" flag is set to a true state, and the "place holder" flag is set to a true state.

As noted in the references field for Message 8, the referenced message ID "D" depends from the referenced message ID "A". Based on this information, the message manager determines that the message having the message ID "D" is not a conversation root. As a result, the place holder for message ID "D" is updated. Specifically, the parent ID field 320 for message ID "D" is updated to indicate message ID "A" as the parent ID. Also, the "root" flag field 330 is updated by changing the "root" flag from a true state to a false state for message ID "D". Finally, all message entries that depend from the conversation root having the message ID "A" are updated by changing the "dirty" flags from a false state to a true state, as shown in FIG. 7*c*. The true state of the "dirty" flag serves as an indicator that either the conversation index has not been generated or the conversation index must be updated.

Next, the message manager 37 generates a conversation index for each message entry having a "dirty" flag set to a true state. In this example, the conversation root is the message having a message ID "A" based on the fact that the "root" flag is set to a true state in the database 39. The conversation index 110*a* (FIG. 4*d*) is generated for the message having a message ID "A". After this conversation index is generated, the conversation indices are generated for all the messages that depend from the conversation root. In this example, a conversation index is generated in a manner previously described in connection with FIG. 7*a* for all of the message entries.

After all of the conversation indices are generated, the conversation indices are stored in the local message store 38 in connection with the appropriate messages. Also, the "dirty" flags then are set to a false state to indicate that the conversation indices are set for the messages, as shown in FIG. 7*d*.

In a third client-server session, there are three messages to be downloaded. Referring to FIG. 4*b*, these messages include: Message 1 having no references in its reference field and having a message ID "A"; Message 4 having a references field consisting of <A>and having a message ID "D"; and Message 5 having a references field consisting of <A><D>and having a message ID "E".

Referring to FIG. 7*e*, the message manager 37 determines that the message ID "A" is located in the database and that the message entry for message ID "A" is a place holder. Based on this information, Message 1 is downloaded to the local message store and the appropriate data fields are populated to provide a complete message entry. Specifically, the title field 310 is populated with the title "Message 1" and the posted time field 325 is populated with the date and time sent "Jan. 4, 1998 08:00:00". A "dirty" flag is set to a true state for the message, and a "place holder" flag is set to a false state for the message entry. In addition, all message entries that depend from the conversation root having the message ID "A" are updated by changing the "dirty" flags from a false state to a true state, as shown in FIG. 7*e*.

Next, turning to FIG. 7*f*, the message manager 37 retrieves the next message ID, namely message ID "D", from the server 49 and determines that the message ID "D" is located in the database 39. The message manager 37 further determines that the message entry for message ID "D" is a place holder. Based on this information, Message 4 is downloaded to the local message store 38, and in the database 39, the title field 310 is populated with the title "Message 4" and the posted time field 325 is populated with the date and time sent "Jan. 4, 1998 08:01:00". The "dirty" flag is already set to a true state for the message because the message depends from the conversation root Message 1, which requires its conversation index to be regenerated. The "place holder" flag is changed from a true state to a false state for the message entry.

Next, turning to FIG. 7g, the message manager 37 retrieves the next message ID, namely message ID "E", from the server 49 and determines that the message ID "E" is located in the database 39. The message manager 37 further determines that the message entry for message ID "E" is a place holder. Based on this information, Message 5 is downloaded to the local message store 38, and in the database 39, the title field 310 is populated with the title "Message 5" and the posted time field 325 is populated with the date and time sent "Jan. 4, 1998 08:02:00". The "dirty" flag is already set to a true state for the message because the message depends from the Message 4, which requires its conversation index to be regenerated. The "place holder" flag is changed from a true state to a false state for the message entry.

After all of the messages have been downloaded from the server 49, the message manager 37 generates a conversation index for each message entry having a "dirty" flag set to a true state. The conversation indices are then stored in the local message store 38 in connection with the appropriate messages. Also, the "dirty" flags are set to a false state to indicate that the conversation indices are set for the messages, as shown in FIG. 7h.

Finally, in the fourth client-server session, there is only one message to be downloaded, namely Message 6, which has a references field consisting of <A><D><E>and has a message ID "F". The message manager performs a similar procedure as previously described in connection with FIGS. 7a–7h.

Referring to FIG. 7i, Message 6 is downloaded to the local message store 38 and the appropriate data fields in the database 39 are populated. Specifically, the title field 310 is populated with the title "Message 6" and the posted time field 325 is populated with the date and time sent "Jan. 4, 1998 08:03:00". The "dirty" flag is set to a true state for the message, and the "place holder" flag is changed from a true state to a false state for the message entry. In addition, any messages that depend from Message 6 is updated by changing the "dirty" flag from a false state to a true state. In this example, Message 7 is the only message that depends from Message 6. As a result, the "dirty" flag is changed from a false state to a true state.

The message manager 37 then generates a conversation index for each message entry having a "dirty" flag set to a true state, which in this case includes Message 6 and Message 7. The conversation indices are then stored in the local message store 38 in connection with the appropriate messages. Also, the "dirty" flags are set to a false state to indicate that the conversation indices are set for the messages, as shown in FIG. 7j.

In view of the foregoing, the present invention effectively and efficiently keeps track of messages that are downloaded from a server to a client and maintains the message order of a threaded conversation. Advantageously, the present invention provides place holders for messages so that missing messages do not ruin the message order.

With continuing reference to FIGS. 1–7, FIG. 8 is a flow diagram illustrating an exemplary method of operation of the present invention. Those skilled in the art will appreciate that this exemplary method of operation is carried out by a client using an application program 36 (FIG. 2), such as the "MICROSOFT OUTLOOK '98" program. The "MICROSOFT OUTLOOK '98" program has a message manager program module 37 (FIG. 3), which is operative to communicate with the remote mail server 49 (FIG. 3). In this embodiment, the client, the remote mail server, and the local message store implement an Internet protocol and operate in an on-line mode.

At start step 500, the exemplary program module is initialized and a connection is made between the client and the server, typically via a modem, for communication. Also, at start step 500, a log-in procedure typically occurs, where a user is prompted to enter a password, and the password is verified by the program module.

Next, in step 505, a command to retrieve a message ID is transmitted from the client to the server. Each message preferably has a message identifier or message ID to identify the message. In response to the command, in step 510, the client retrieves a message ID from the server. Next, the message ID is compared to each message entry in a client-based database, in step 510. The database preferably contains message-related information for news messages. This message-related information is maintained in the database particularly in connection with generating a conversation index for conversation threading.

A central inquiry is made, in step 520, as to whether the message ID retrieved from the server matches any of the Message IDs in the database. If there is a match, the "YES" branch is followed to step 530; otherwise, the "NO" branch is followed to step 525. In step 530, another inquiry is made as to whether the message entry is a place holder.

To determine whether a message entry is a place holder, the message manager checks the state of a "place holder" flag for the message. If the "place holder" flag is set to a false state, the message entry in not a place holder, and the "NO" branch then is followed to step 535. In step 535, a determination is made as to whether there are any additional messages located on the server. If there are additional messages located on the server, the "YES" branch is followed to step 510, in which case, the next message ID is retrieved; otherwise, the "NO" branch is followed to the end step 575.

If the "place holder" flag is set to a true state, the message entry is a place holder, and the "YES" branch is followed to step 525. In step 525, download operations are performed to download the message from the server to the client. The process of downloading a message and setting data fields in the database are described in greater detail below in connection with FIG. 9.

After download operations are performed, in step 527, message entries are updated, if necessary, in the database. For example, parent ID fields may be updated to reflect changes in conversation roots, "dirty" flags may change states, "root" flags may change states, and so forth.

After the message entries have been updated, in step 540, a determination is made as to whether there are any additional messages located on the server. If there are additional messages located on the server, the "YES" branch is followed to step 510, in which case, the next message ID is retrieved; otherwise, the "NO" branch is followed to step 545.

A determination is made, in step 545, as to whether there have been any conversation roots downloaded to the client. If a conversation root has been downloaded, the "YES" branch is followed to step 555; otherwise, the "NO" branch is followed to step 550. In step 555, a conversation index is generated for the conversation root, as previously described in connection with FIGS. 4–7. Next, in step 570, a conversation index is generated for all reply messages that depend on the conversation root. If a reply message does not have a conversation root or no conversation roots have been downloaded, in step 550, a conversation index is generated based on the parent ID.

Once all conversation indices have been generated, in step 560, the conversation indices are stored in association with their respective downloaded messages in a local message store, such as a MAPI store. Next, all "dirty" flags are set to a false state to indicate that a conversation index has been generated for the respective message. The process terminates at the end step 575.

Figure 8:
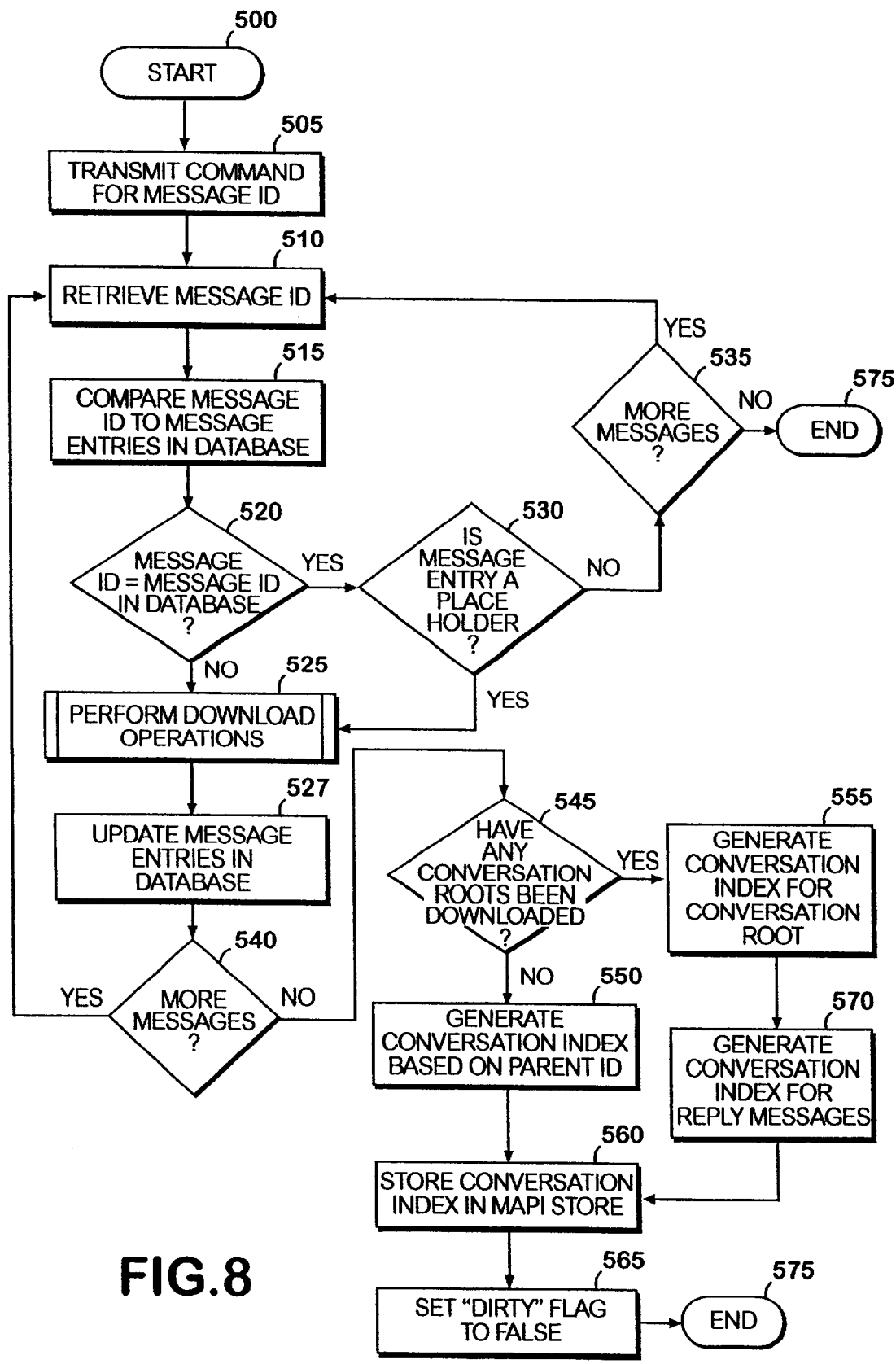
FIG. 8 is a flow diagram illustrating an exemplary method of operation utilizing a client-based database in accordance with an exemplary embodiment of the present invention.
Figure 9:
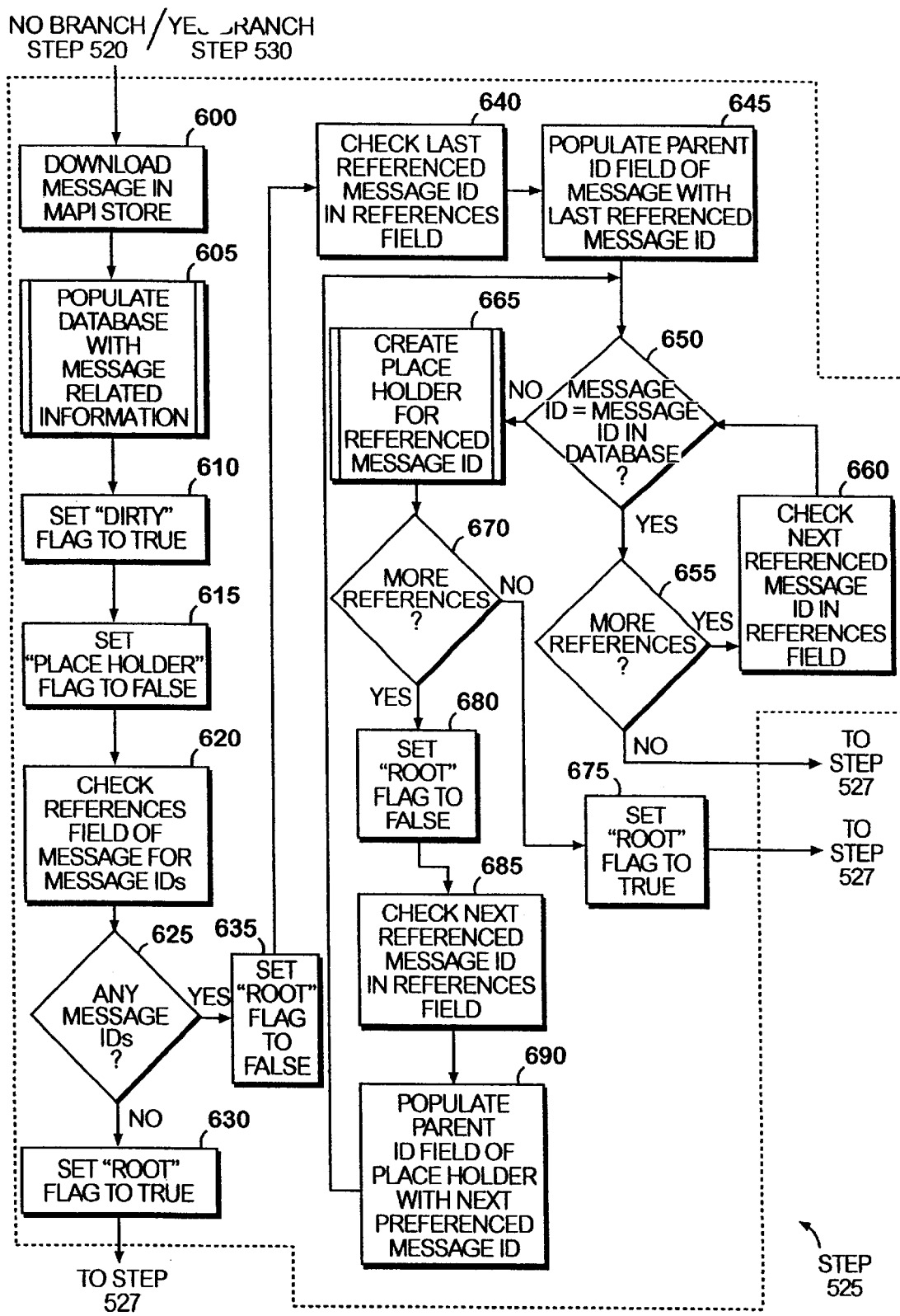
FIG. 9 is a flow diagram illustrating an exemplary process of downloading a message from the server to the client.

Now turning to FIG. 9, a flow diagram illustrating an exemplary process of downloading a message from the server to the client is described. Specifically, steps 600–690 represent the process of downloading a message and setting data fields in a database as described in connection with step 525 of FIG. 8.

In step 600, a message is downloaded from the server to the MAPI store located at the cliént. Next, in step 605, data fields in the database are populated with message-related information, such as an article number, a title, and a message ID for the message. The process of populating data fields is described in greater.detail below in connection with FIGS. 10a and 10b. Specifically, FIG. 10a illustrates the population of data fields for a message that does not have a matching message ID in the database, and FIG. 10b illustrates the population of data fields for a message that has a place holder in the database.

Referring still to FIG. 9, once data fields are populated with the message-related information, a "dirty" flag is set to a true state in step 610. As previously mentioned in connection with FIGS. 6a and 6b, the true state of the "dirty" flag is indicative of a message that does not have a conversation index set in the local message store. The true state of the "dirty" flag is also indicative of the message being "dirtied" because a conversation index of another message from which the message depends has not been set or has become "dirtied".

In step 615, a "place holder" flag is set to a false state. The false state of the "place holder" flag is indicative of the message being downloaded and the message-related information for the downloaded message being populated in the database.

Next, the references field of the message is checked for message IDs, in step 620. Each message has a references field that can include a single message ID, a group of message IDs, or no reference at all. In the case where the message has no reference, the message is a conversation root or root message. In other words, the message with no reference is the original message having no links to other messages. In the case where the message has at least one message ID, the message is a reply or nested message and is linked to any messages referenced in the references field.

Next, a determination is made, in step 625, as to whether there are any message IDs in the references field of the downloaded message. If so, the "YES" branch is followed to step 635, in which case a "root" flag is set to a false state. The false state of the "root" flag is indicative of the message being a reply message and not a conversation root. If there is no message ID in the references field, the "NO" branch is followed to step 630, in which case the "root" flag is set to a true state. The true state of the "root" flag is indicative of the message being a root message or conversation root. After step 630, the process branches to step 527 (FIG. 8).

In the case where the message has at least one reference, in step 640, the last referenced Message ID in the references field is checked. This referenced message is considered the parent of the downloaded message. Next, in step 645, the parent ID field is populated with the last referenced message ID.

Based on this referenced message ID, a determination is made, in step 650, as to whether the referenced message ID matches any of the message IDs in the database. If there is a match, the "YES" branch is followed to step 655; otherwise, the "NO" branch is followed to step 665. In step 655, a central inquiry is made as to whether there are additional references in the references field of the message. If so, the "YES" branch is followed to step 660, in which case the next referenced message ID in the references field is checked. It will be understood that the next referenced message ID is the reference located to the immediate left of the last referenced message ID in a tree structure conversation threading scheme.

Once the next referenced message ID is checked, the same determination is made, in step 650, as to whether the next referenced message ID matches any of the message IDs in the message ID field in the database. If there are not any additional references in the references field of the message, the "NO" branch is followed to step 527 (FIG. 8).

In step 665, a place holder is created for the referenced message ID when there is not a match for the message ID in the database. The process of creating a place holder is described in greater detail below in connection with FIG. 11. Next, a determination is made, in step 670, as to whether there are additional references in the references field of the message. If so, the "YES" branch is followed to step 680, in which case the "root" flag for the message is set to a false state; otherwise, the "NO" branch is followed to step 675, in which case the "root" flag for the message is set to a true state. After step 675, the process branches to step 527 (FIG. 8).

Upon completion of step 680, the next referenced message ID in the references field is checked, in step 685. This referenced message is considered the parent of the non-downloaded message having the place holder. Consequently, in step 690, the parent ID field is populated with the next referenced message ID. Based on the next referenced message ID, a determination is made, in step 650, as to whether the referenced message ID matches any of the message IDs in the database. This entire process, steps 600-690, is performed for each message on the server.

Figure 10:
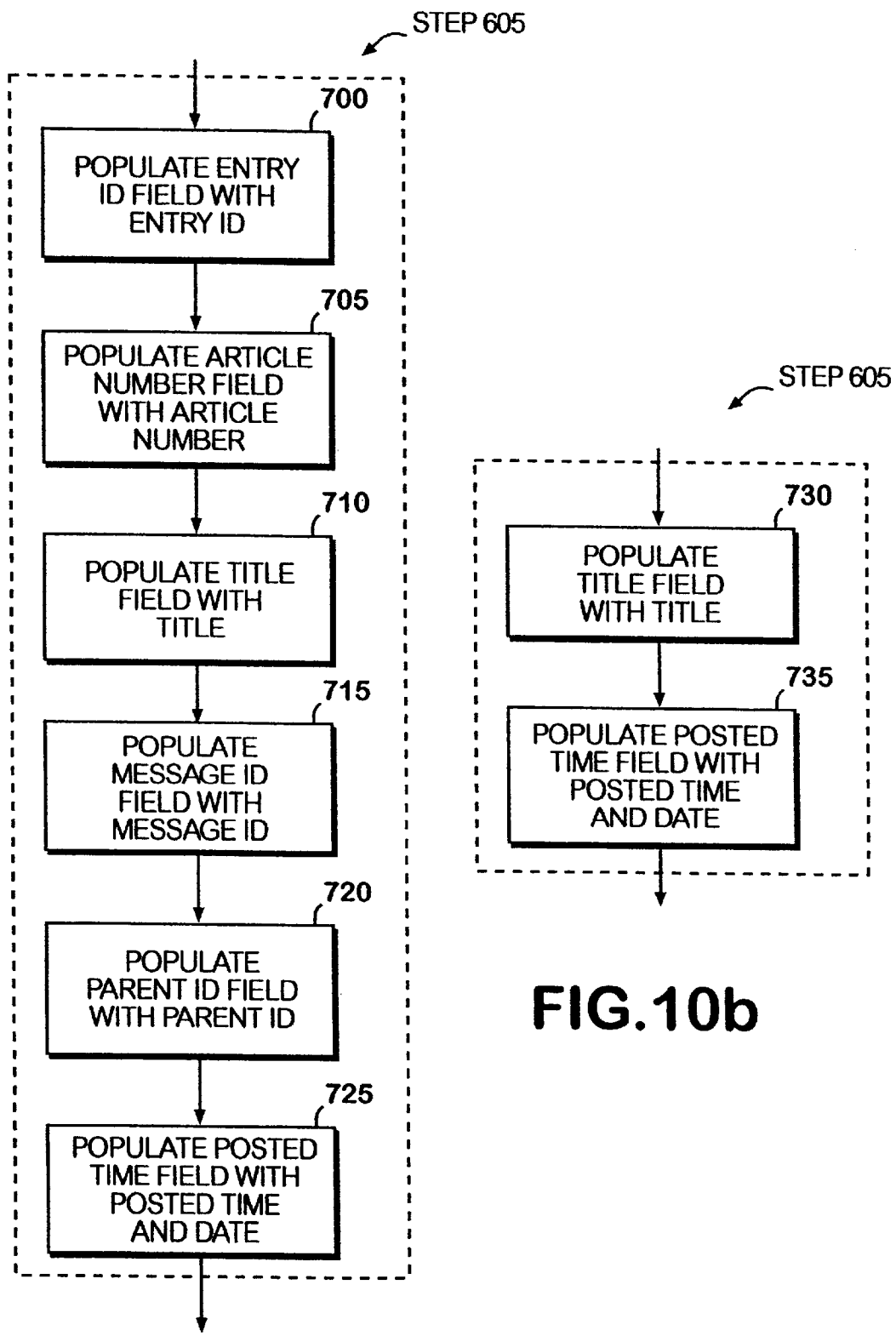
FIGS. 10a and 10b, collectively referred to as FIG. 10, are flow diagrams illustrating an exemplary process of populating data fields within a database.

With continuing reference to FIG. 9, FIGS. 10a and 10b, collectively referred to as FIG. 10, are flow diagrams illustrating an exemplary process of populating data fields in accordance with an exemplary embodiment of the present invention. Referring to FIG. 10a, the population of data fields for a message that does not have a matching message ID in the database is described, where steps 700–725 represent this process as described in connection with step 605 of FIG. 9. In step 700, an entry identifier or ID is populated in an entry ID field in the database. Next, an article number for the message is populated in an article number field in the database, in step 705. A title for the message is then populated, in step 710, in a title field in the database. In step 715, a message identifier is populated in a message ID field in the database. Next, in step 720, a parent identifier or ID is populated in a parent ID field in the database. Finally, a posted or sent time and date for the message is populated, in step 725, in a posted time field in the database.

Turning to FIG. 10b, a flow diagram illustrating the population of data fields for a message that has a place holder in the database is described, where steps 730 and 735 represent this process as described in connection with step 605 of FIG. 9. In the case where a place holder is in the database, specific message-related information has already been placed in their appropriate fields. As previously mentioned in connection with FIG. 9, the process of creating a place holder is described below in FIG. 11. Hence, the remaining information is stored in the database after the message has been downloaded from the server. Specifically, in step 730, a title for the message is populated in the title field in the database. Finally, a posted time and date for the message is populated, in step 735, in a posted time field in the database.

Figures 11, 12:
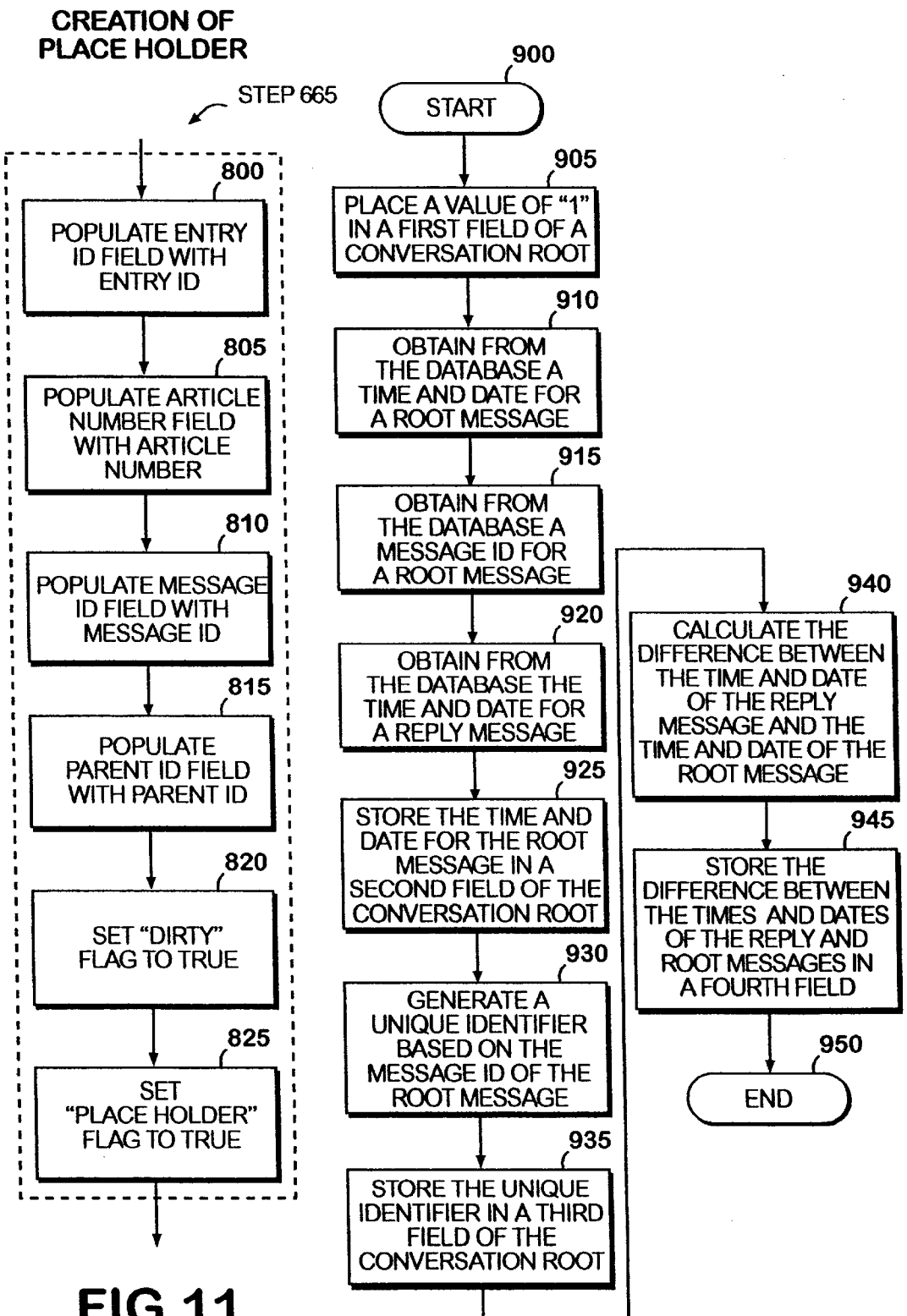
FIG. 11 is a flow diagram illustrating an exemplary process for creating a place holder in accordance with an exemplary embodiment of the present invention.
FIG. 12 is a flow diagram illustrating an exemplary process for generating a conversation index based on message-related information in a database.

With continuing reference to FIGS. 1–10. FIG. 11 is a flow diagram illustrating an exemplary process for creating a place holder in accordance with an exemplary embodiment of the present invention. Specifically, steps 800–825 represent this process as described in connection with step 665 of FIG. 9. In step 800, an entry identifier or ID is populated in an entry ID field in the database. Next, an article number for the message is populated in an article number field in the database, in step 805. A message identifier or ID is populated, in step 810, in a message ID field in the database. Next, in step 815, a parent identifier or ID is populated in a parent ID field in the database. A "dirty" flag for the message is set to a true state, in step 820. Finally, a "place holder" flag for the message is set to a true state, in step 825, thereby indicating that the message entry is a place holder.

Referring to FIG. 12, a flow diagram illustrating an exemplary process for generating a conversation index based on message-related information in a client-based database is described. In the start step 900, all of the messages in a client-server session have been downloaded and the appropriate fields in the database have been populated. In addition, at the start step 900, assume a message is selected having a references field containing only one message ID, thereby indicating that the message is a reply message and not a root message.

To generate a conversation index for the message, in step 905, the message manager places a value of "1" in a first field of the conversation index. Typically, the first field is unused in MAPI format-sensitive applications. Consequently, a value of "1" is used as a default value in the first field. Next, in step 910, the message manager obtains from the database a time and date for the root message. The message ID for the root message is also obtained from the database, in step 915. Next, in step 920, the message manager obtains from the database a time and date for the reply message. Once the information in steps 910, 915, and 920 have been obtained from the database, in step 925, the exemplary program module stores the time and date of the root message in a second field of the conversation index. Next, the message manager generates, in step 930, a unique identifier for the root message based on the message ID of the root message obtained from the database. The unique identifier is generated by using a "hashing" process to convert the arbitrary length of the message ID to the fixed length of a unique identification field. The unique identifier then is stored in the unique identification field or a third field of the conversation index, in step 935.

Next, in step 940, the message manager calculates the difference between the time and date of the reply message and the time and date of the root message to produce a difference "delta" for the reply message. This difference "delta" is then stored, in step 945, in a fourth field. The delta of the conversation index represents a child of the conversation. Moreover, a delta preferably is generated for each child of the conversation when there are additional references in the reference field. The process of generating a conversation index terminates at the end step 950.

In summary, it will be understood that the present invention provides a system for managing messages communicated within a client-server architecture, such as a distributed computing environment represented by a client and a server. The present invention uses a database, stored at the client, to maintain a central archive of message-related information to support conversation threading operations between the client and the server. Communications with a message server are facilitated by accessing a client-based database representing a central archive of message-related information. Archived information is accessed in the client-based database during typical message communications operations, such as message download operations. This information is then used to convert messages from a tree structure conversation threading scheme to a MAPI format for use in a MAPI store.

The invention may conveniently be implemented in one or more program modules that are based upon and implement the features illustrated in FIGS. 3–11. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes. In addition, although the invention was described in the context of a e-mail client, mail server, and message store, that implement one of a variety of Internet protocols, those skilled in the art will appreciate that the invention is applicable to remote servers that include other types of data stores, message stores, and file stores, and in other operating environments.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a distributed computer system including a server and a client, the client including a local message store and a database, a method for managing conversation threads based on message-related information for a message having a message identifier and a references field, the message-related information being stored in the database, comprising the steps of:

(a) during a client-server session, retrieving from the server the message-related information corresponding to the message;

(b) based on the message-related information, determining whether the message has been previously downloaded from the server to the local message store located at the client;

(c) in response to determining that the message has not been previously downloaded from the server to the local message store, i. downloading the message from the server to the local message store, and ii. populating a plurality of data fields in the database with the message-related information;

(d) determining whether the references field of the message is empty;

(e) in response to determining that the references field of the message is empty, providing an indication in the database that the message is a conversation root;

(f) providing an indication in the database that a conversation index has not been determined for the message;

(g) repeating the steps (a) through (f) for each remaining message on the server; and (h) generating, based on the conversation root, the conversation index for each message downloaded from the server to the local message store.

2. The method of claim 1, wherein the message-related information comprises the message identifier for identifying the message, an article number for identifying the number of the article for the message, a title for identifying the title of the message, and a parent identifier for identifying the parent of the message.

3. The method of claim 2, wherein the message-related information further comprises a posted time for indicating a time and date that the message is posted to a news server.

4. The method of claim 3, wherein the data fields of the database comprise a message identification field for the message identifier, an article number field for the article number, a title field for storing the title of the message, a parent identification field for storing the parent identifier for the message, and a posted time field for storing the time and date of the message.

5. The method of claim 4, wherein the step of populating the data fields in the database with the message-related information further comprises the steps of:

populating the message identification field with the message identifier;

populating the article number field with the article number;

populating the title field with the title of the message;

populating the parent identification field with the parent identifier for the message; and populating the posted time field with the time and date of the message.

6. The method of claim 1, wherein the step of providing an indication in the database that a conversation index has not been determined for the message comprises setting a "dirty" flag to a true state in the database.

7. The method of claim 1, wherein the step of generating, based on the conversation root, the conversation index for each message downloaded from the server to the local message store comprises:

creating a preamble based on the conversation root; and if the message is not the conversation root, creating a reply message field for maintaining a difference delta defining a difference between a sent time of the message and a sent time of the conversation root.

8. The method of claim 7, wherein the step of creating the preamble based on the conversation root comprises:

placing a value of one in a first field of the preamble;

storing the sent time of the conversation root in a second field of the preamble; and generating a unique identifier based on the message identifier of the conversation root; and storing the unique identifier in a third field of the preamble.

9. The method of claim 1, wherein after generating the conversation index for each downloaded message, the method further comprises the step of providing an indication in the database that the conversation index has been determined for the message.

10. The method of 9, wherein the step of providing an indication in the database that the conversation index has been determined for the message comprises setting a "dirty" flag to a false state in the database.

11. The method of 1, wherein after generating the conversation index for each downloaded message, the method further comprising the step of storing the conversation index for the downloaded message in the local message store.

12. The method of 1, wherein the step of determining whether the message has been downloaded from the server to the local message store comprises comparing the message identifier for the message to at least one message identifier in the database and determining whether the message identifier for the message matches the one message identifier in the database.

13. A method for generating a conversation index based on message-related information for a reply message, the reply message arranged in a news conversation threading structure and including a message identifier and a reference, the reference including a message identifier for a root message, the message-related information stored in a database, located at the client, and including the message identifier and a time and date for the root message and the reply message, the conversation index supporting conversation threading so that the root message and the reply message are grouped in a MAPI format for use in a MAPI format-sensitive application, the conversation index comprising fields arranged in the MAPI format, the method comprising the steps of:

(a) placing a value in a first field of the conversation index;

(b) obtaining from the database:
  i. the time and date for the root message,
  ii. the message identifier for the root message, and
  iii. the time and date for the reply message;

(c) storing the time and date of the root message in a second field of the conversation index;

(d) generating a unique identifier based on the message identifier of the root message;

(e) storing the unique identifier in a third field of the conversation index;

(f) determining a difference between the time and date of the reply message and the time and date of the root message; and (g) storing the difference between the time and date of the reply message and the time and date of the root message in a fourth field of the conversation index, the conversation index representing the reply message in the MAPI format for use in the MAPI format-sensitive application.

14. The method of claim 13, wherein the reply message has an additional reference containing a message identifier for a second reply message, the message identifier for the second reply message and a time and date for the second reply message being stored in the database; and wherein the method further comprises:

consulting the database to obtain the time and date for the second reply message;

determining a difference between the time and date of the second reply message and the time and date of the root message; and storing the difference between the time and date of the second reply message and the time and date of the root message in a fifth field of the conversation index.

15. The method of claim 13, wherein placing a value in a first field of the conversation index comprises placing a value of "1" in the first field of the conversation index.

16. The method of claim 13, wherein the step of generating a unique identifier based on the message identifier of the root message comprises performing a hashing process to convert the length of the message identifier to a fixed length.

17. The method of claim 13, wherein the reply message has additional references each including a message identifier for an additional message and a time and date for the additional message, the method further comprising for each additional reference, determining a difference delta, delta defining the difference between the time and date of the additional message and the time and date of the root message, and for each additional reference, storing the difference delta in an additional field of the conversation index.

18. A method for creating, in a database located at a client, a place holder from a reply message that has been downloaded in the database from a server, the reply message including a references field for hosting a reference comprising a message identifier for a second message, the method comprising the steps of:

(a) determining whether the references field of the reply message includes the reference comprising the message identifier for the second message;

(b) in response to determining that the reference includes the message identifier for the second message, determining whether the message identifier for the second message is located in a message identification field in the database, the message identification field storing message identifiers for messages;

(c) in response to determining that the message identifier for the second message is not located in the message identification field, downloading into the database a message entry from the server, comprising the message identifier for the second message; and (d) providing an indication in the database that the message entry is a place holder.

19. The method of claim 18, wherein further in response to determining that the reference includes the message identifier for the second message, storing the message identifier for the second message as a parent identifier for the reply message.

20. The method of claim 18, further comprising the step of providing an indication in the database that a conversation index has not been generated.

21. The method of claim 20, wherein the step of providing an indication in the database that a conversation index has not been generated comprises setting a "dirty" flag to a true state in the database.

22. The method of claim 18, further comprising the steps of:

determining whether there is an additional reference in the references field for the reply message, the additional reference including a message identifier for an additional message;

in response to determining that there is no additional reference in the references field for the reply message, providing an indication in the database that the second message is a root message; and generating, based on the second message, a conversation index for the second message and the reply message.

23. The method of claim 22, further comprising the steps of:

in response to determining that there is the additional reference for the message reply, providing an indication in the database that the second message is not the root message;

storing the message identifier for the additional message as the parent identifier for the second message;

determining whether the message identifier for the additional message is located in the message identification field in the database;

in response to determining that the message identifier for the additional message is not located in the message identification field, downloading into the database a second message entry comprising the message identifier for the additional message from the server; and providing an indication in the database that the second message entry is a place holder.

24. The method of claim 23, wherein the step of providing an indication in the database that the second message is not the root message comprises setting a "root" flag to a false state in the database.

25. The method of claim 22, wherein the step of providing an indication in the database that the second message is the root message comprises setting a "root" flag to a true state in the database.

26. The method of claim 22, wherein the step of generating, based on the second message, a conversation index for the second message comprises creating a preamble based on the second message comprising the steps of:

placing a value in a first field of the conversation index;

selecting an arbitrary time and date for the second message;

storing the arbitrary time and date of the second message in a second field of the conversation index; and based on the message identifier of the second message, storing a unique identifier in a third field of the conversation index.

27. The method of claim 26, wherein the step of generating, based on the second message, a conversation index for the reply message comprises the steps of:

determining a difference between a time and date of the reply message and the arbitrary time and date of the second message; and storing the difference between the time and date of the reply message and the arbitrary time and date of the second message in a fourth field of the conversation index.

28. The method of claim 18, wherein the step of providing an indication in the database that the message entry is a place holder comprises setting a "place holder" flag to a true state in the database.

29. A method for generating a conversation index based on message-related information for a root message, the root message arranged in a news conversation threading structure and including a message identifier, the message-related information stored in a database, located at the client, and including the message identifier and a time and date for the root message, the conversation index supporting conversation threading so that the root message is converted to a MAPI format for use in a MAPI format-sensitive application, the conversation index comprising fields arranged in the MAPI format, the method comprising the steps of:

(a) placing a value in a first field of the conversation index;
(b) obtaining from the database:
   i. the time and date for the root message, and
   ii. the message identifier for the root message;
(c) storing the time and date of the root message in a second field of the conversation index;
(d) generating a unique identifier based on the message identifier of the root message; and
(e) storing the unique identifier in a third field of the conversation index,
the conversation index representing the root message in the MAPI format for use in the MAPI format-sensitive application.

30. The method of claim 29, wherein placing a value in a first field of the conversation index comprises placing a value of "1" in the first field of the conversation index.

* * * * *